United States Patent
Ohno et al.

(10) Patent No.: US 10,341,386 B2
(45) Date of Patent: Jul. 2, 2019

(54) SECURITY INFORMATION UPDATE SYSTEM, INFORMATION PROCESSING APPARATUS, SECURITY INFORMATION UPDATE METHOD AND NON-TRANSITORY COMPUTER-READABLE RECORDING MEDIUM ENCODED WITH SECURITY INFORMATION UPDATE PROGRAM

(71) Applicant: Konica Minolta, Inc., Chiyoda-ku, Tokyo (JP)

(72) Inventors: Hiroyuki Ohno, Toyokawa (JP); Jun Shiraishi, Toyokawa (JP); Hiroaki Sugimoto, Nagoya (JP); Yoshikazu Takesada, Kawabe (JP); Taketoshi Yamahata, Toyokawa (JP); Yusuke Shinosaki, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/290,174

(22) Filed: Oct. 11, 2016

(65) Prior Publication Data

US 2017/0118248 A1  Apr. 27, 2017

(30) Foreign Application Priority Data

Oct. 22, 2015 (JP) ................................. 2015-207743

(51) Int. Cl.
*H04L 29/06* (2006.01)
*H04L 29/08* (2006.01)

(52) U.S. Cl.
CPC ............ *H04L 63/20* (2013.01); *H04L 63/083* (2013.01); *H04L 67/34* (2013.01)

(58) Field of Classification Search
CPC ............................. H04L 63/20; H04L 63/083
See application file for complete search history.

(56) References Cited

U.S. PATENT DOCUMENTS

2006/0271789 A1  11/2006  Satomura et al.
2010/0064341 A1*  3/2010  Aldera ................. H04L 63/102
                                                              726/1

(Continued)

FOREIGN PATENT DOCUMENTS

JP  2004-326763  11/2004
JP  2012-252624 A  12/2012

OTHER PUBLICATIONS

Notice of Ground of Rejection issued in corresponding Japanese Patent Application No. 2015/207743, dated Jul. 11, 2017, with English Translation (12 pages).

*Primary Examiner* — Dao Q Ho
(74) *Attorney, Agent, or Firm* — Buchanan Ingersoll & Rooney PC

(57) ABSTRACT

The management server includes a policy storage that stores a security policy, and a first hardware processor that, in response to reception of a preparation completion notification from each of all of two or more information processing apparatuses, outputs an update instruction to each of the two or more information processing apparatuses. Each of the plurality of information processing apparatuses includes a security information storage that stores security information, and a second hardware processor that executes a process using any of the stored security information, acquires new security information corresponding to security information to which the reference date and time, which the current date and time have passed, correspond, transmits a preparation completion notification to the management server, and in response to reception of the update instruction from the management server, updates the security information with the new security information.

14 Claims, 12 Drawing Sheets

(56) References Cited

U.S. PATENT DOCUMENTS

2010/0242082 A1\* 9/2010 Keene ................ G06F 21/6218
　　　　　　　　　　　　　　　　　　　　　　　726/1
2015/0169879 A1\* 6/2015 Hagiuda ............ G06F 17/3023
　　　　　　　　　　　　　　　　　　　　　　　726/26

\* cited by examiner

FIG. 5

| TYPE | REFERENCE DATE AND TIME | GROUP DEVICES |
|---|---|---|
| mail-account-A | EVERY MONTH, 1, 00:00 | MAIL SERVER, MFP-1, MFP-2, MFP-3, MFP-4, MFP-5 |
| DB-account-B | EVERY MONTH, 10, 00:00 | DB SERVER, MFP-1, MFP-2, MFP-3, MFP-4, MFP-5 |
| HDD ENCRYPTION | EVERY MONTH, 15, 00:00 | MFP-1, MFP-2, MFP-3, MFP-4, MFP-5 |
| DATA ENCRYPTION | EVERY MONTH, 20, 00:00 | MFP-1, MFP-2, MFP-3, MFP-4, MFP-5 |

SECURITY INFORMATION UPDATE SYSTEM, INFORMATION PROCESSING APPARATUS, SECURITY INFORMATION UPDATE METHOD AND NON-TRANSITORY COMPUTER-READABLE RECORDING MEDIUM ENCODED WITH SECURITY INFORMATION UPDATE PROGRAM

This application is based on Japanese Patent Application No. 2015-207743 filed with Japan Patent Office on Oct. 22, 2015, the entire content of which is hereby incorporated by reference.

BACKGROUND OF THE INVENTION

Field of the Invention

The present invention relates to a security information update system, an information processing apparatus, a security information update method, and a non-transitory computer-readable recording medium encoded with a security information update program. The present invention relates to a security information update system that updates security information stored in each of a plurality of information processing apparatuses, the information processing apparatus, a security information update method performed by the security information update system and the information processing apparatus, and a non-transitory computer-readable recording medium encoded with the security information update program.

Description of the Related Art

An information processing apparatus represented by an Multi Function Peripheral (hereinafter referred to as an MFP) communicates with an external device, and the information processing apparatus and the external device sometimes execute a process in cooperation with each other. In this case, a predetermined password is used between two or more devices in order for each of the two or more devices that communicate with each other to confirm the device at the other end of communication. Further, this password requires confidentiality, so that it is preferably administered by an administrator who administers the information processing apparatuses and changed regularly or irregularly. However, in the case where the password is changed, it is necessary to change the password in all of the plurality of respective information processing apparatuses that store the password.

Japanese Patent Laid-Open No. 2012-252624 discloses an information processing apparatus, which is connected to a management server that manages a device user based on user information and controls utilization of the device by the user based on the user information, includes an acceptance means for accepting a request for user authentication, a determination means for, in response to the acceptance of the request for the user authentication, determining whether current date and time have passed a valid period of internal user information, which is stored in the information processing apparatus, of the user whose authentication has been requested, an acquisition means for, in the case where it is determined that the current date and time have passed the valid period, acquiring external user information of the user whose authentication is requested from the management server, an update means for updating the internal user information based on the acquired external user information, and a control means for controlling whether the user whose authentication is requested is allowed to utilize the device based on the updated internal user information.

In the information processing apparatus described in JP 2012-252624, in the case where the current date and time have passed the valid period of the user information, it is prerequisite that the user uses the updated user information. Therefore, in the case where the current date and time have passed the valid period of the user information, it is necessary to notify the user of the updated user information. Further, there is a problem that the user must remember the pre-update user information and the updated user information, and must separately use the new user information and the old user information depending on whether it is after or before the current date and time pass the valid period.

SUMMARY OF THE INVENTION

According to one aspect of the present invention, a security information update system that includes a management server and a plurality of information processing apparatuses, the management server includes a policy storage that stores a security policy defining one or more sets of two or more pieces of device identification information respectively corresponding to the plurality of information processing apparatuses, identification information for identifying security information, and reference date and time, and a first hardware processor, in response to reception of a preparation completion notification corresponding to identification information included in a set including reference date and time, which current date and time have passed, among the one or more sets defined by the security policy from each of all of two or more information processing apparatuses specified by each of two or more pieces of device identification information included in the set including the reference date and time, which the current date and time have passed, outputs an update instruction corresponding to the identification information included in the set including the reference date and time, which the current date and time have passed, to each of the two or more information processing apparatuses, and each of the plurality of information processing apparatuses includes a security information storage that stores security information, and a second hardware processor, wherein the second hardware processor executes a process using any of the stored security information, acquires new security information corresponding to security information to which the reference date and time, which the current date and time have passed, correspond among the stored security information, in response to the acquisition of the new security information, transmits a preparation completion notification corresponding to identification information of the new security information to the management server, and in response to reception of the update instruction from the management server, updates the security information specified by the identification information corresponding to the update instruction among the stored security information with the new security information.

According to another aspect of the present invention, n information processing apparatus includes a security information storage that stores security information common with one or more other information processing apparatuses, and a hardware processor, wherein the hardware processor executes a process using any of the stored security information, acquires new security information corresponding to security information to which predetermined reference date and time, which current date and time have passed, correspond among the stored security information, in response to the acquisition of the new security information, transmits a preparation completion notification corresponding to identification information of the new security information to a management server, and in response to reception of an update instruction, which corresponds to the identification information and is transmitted by the management server in response to the reception of the preparation completion notifications corresponding to the identification information from all of devices that store the security information specified by the identification information corresponding to the preparation completion notifications, updates the security information specified by the identification corresponding to the update instruction among the one or more pieces of stored security information with the new security information.

According to yet another aspect of the present invention, security information update method performed by an information processing apparatus including a security information storage that stores security information common with one or more other information processing apparatuses includes a process execution step of executing a process using any of the stored security information, an authentication information acquisition step of acquiring new security information corresponding to security information to which predetermined reference date and time, which current date and time have passed, correspond among the stored security information, a preparation completion notification step of, in response to the acquisition of the new security information in the authentication information acquisition step, transmitting a preparation completion notification corresponding to identification information of the new security information to a management server, and an update step of, in response to reception of an update instruction, which corresponds to the identification information and is transmitted by the management server in response to reception of the preparation completion notifications corresponding to the identification information from all of devices that store the security information specified by the identification information corresponding to the preparation completion notification, updating the security information specified by the identification information corresponding to the update instruction among the one or more pieces of stored security information with the new security information.

According to yet another aspect of the present invention, a non-transitory computer-readable recording medium encoded with a security information update program executed by a computer which controls an information processing apparatus including a security information storage that stores security information common with one or more other information processing apparatuses, wherein the security information update program causes the computer to execute, a processing execution step of executing a process using any of the stored security information, an authentication information acquisition step of acquiring new security information corresponding to security information to which predetermined reference date and time, current date and time have passed, correspond among the stored security information, a preparation completion notification step of, in response to the acquisition of the new security information in the authentication information acquisition step, transmitting a preparation completion notification corresponding to identification information of the new security information to a management server, and an update step of, in response to reception of an update instruction, which corresponds to the identification information and is transmitted by the management server in response to reception of the preparation completion notifications corresponding to the identification information from all of devices that store the security information specified by the identification information corresponding to the preparation completion notification, updating the security information specified by the identification information corresponding to the update instruction among the one or more pieces of stored security information with the new security information.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 5 is a diagram showing one example of a policy table;

DESCRIPTION OF THE PREFERRED EMBODIMENTS

Figure 1:
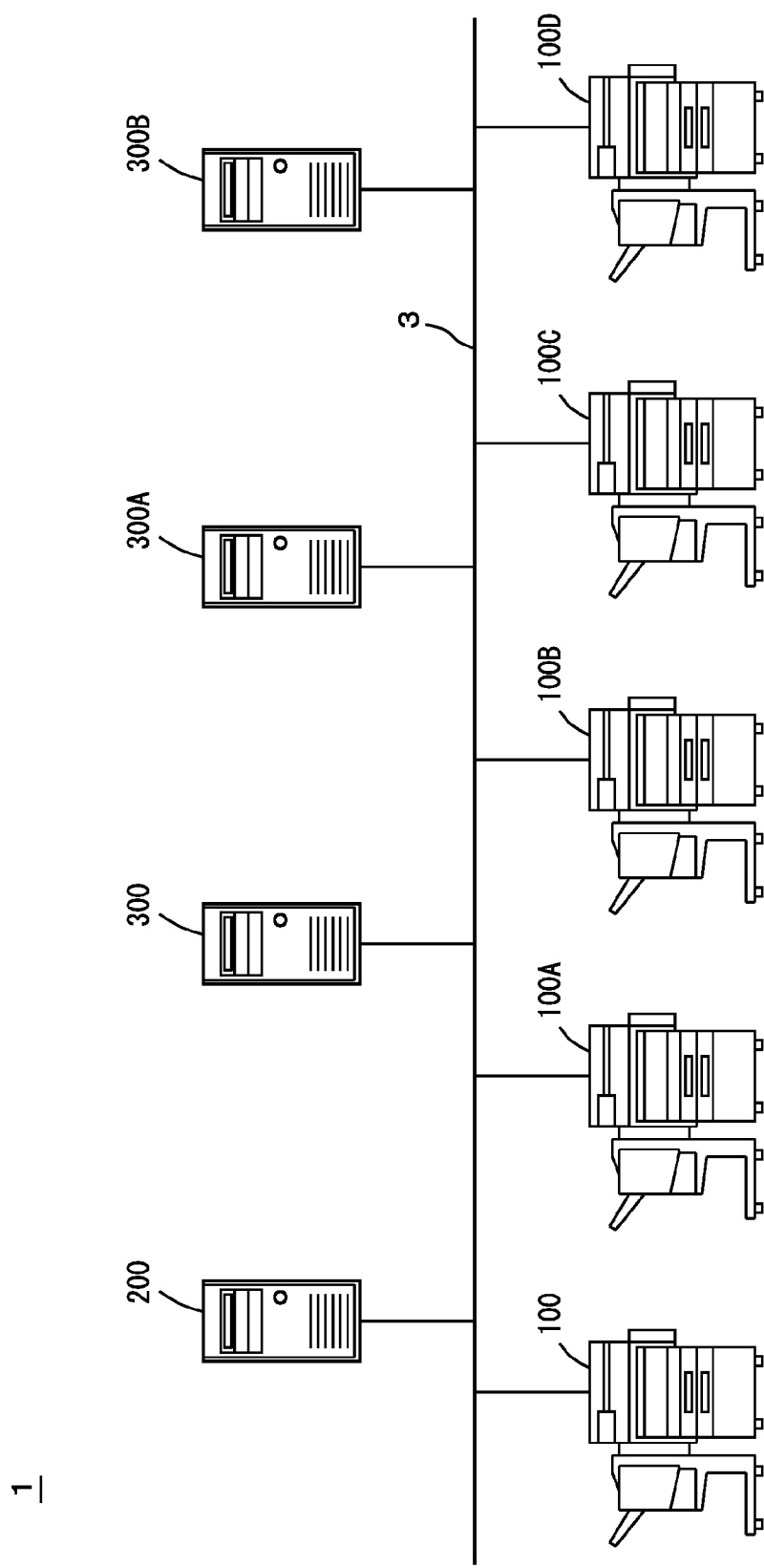
FIG. 1 is a diagram showing one example of an overview of a security information update system in the present embodiment.

The preferred embodiments of the present invention will be described below with reference to the drawings. In the following description, the same or corresponding parts are denoted by the same reference characters. Their names and functions are also the same. Thus, a detailed description thereof will not be repeated.

FIG. 1 is a diagram showing one example of an overview of a security information update system in the present embodiment. Referring to FIG. 1, the security information update system 1 includes a management server 200, service provision servers 300, 300A, 300B and MFPs (Multi Function Peripherals) 100, 100A to 100D. The management server 200, the service provision servers 300, 300A, 300B and the MFPs 100, 100A to 100D are respectively connected to a network 3. The network 3 is a Local Area Network (LAN), for example. Therefore, the management server 200, the service provision servers 300, 300A, 300B and the MFPs 100, 100A to 100D can communicate with one another. Each of the MFPs 100, 100A to 100D and the service provision servers 300, 300A, 300B is one example of an information processing apparatus. Each of the MFPs 100, 100A to 100D has the same hardware configurations and functions. Therefore, the MFP 100 is described here as an example unless otherwise stated.

While the network 3 is specified here as the LAN, the network 3 is not limited to the LAN. The network 3 may be the internet, a Wide Area Network (WAN), a network using the Public Switched Telephone Network (PSTN) or the like.

Each of the service provision servers 300, 300A is one example of the information processing apparatus, and a computer that provides predetermined services. The service provision server 300 functions here as a mail server that provides a service of transmitting and receiving electronic mails, and the service provision server 300A functions here as a database server (hereinafter referred to as a DB server) that provides a database. The service provided by each of the service provision servers 300, 300A is not limited to the above, and may be other services.

Each of the service provision servers 300, 300A provides services on the condition that authentication of a device or a user that has accessed each of the service provision servers 300, 300A is successful in order to increase the security. Specifically, a set of identification information and security information is registered in advance in each of the service provision servers 300, 300A, and each of the service provision servers 300, 300A provides services to the device that has transmitted the registered set of the identification information and the security information. The identification information stored in each of the service provision servers 300, 300A is an account for identifying the device or the user that accesses each of the service provision servers 300, 300A, and the security information is an administrator password. Each of the MFPs 100, 100A to 100D here stores the set of the identification information and the security information registered for each of the service provision servers 300, 300A. In other words, each of the MFPs 100, 100A to 100D stores the set of the identification information and the security information registered in the service provision server 300, and the set of the identification information and the security information registered in the service provision server 300A. Therefore, classification into a first group composed of the MFPs 100, 100A to 100D and the service provision server 300, and a second group composed of the MFPs 100, 100A to 100D and the service provision server 300A is made. The same set of the identification information and the security information is stored in each of the MFPs 100, 100A to 100D and the service provision server 300, which are classified as being in the first group, and the same set of the identification information and the security information is stored in each of the MFPs 100, 100A to 100D and the service provision server 300A, which are classified as being in the second group. The identification information corresponding to the first group and the identification information corresponding to the second group are different from each other.

For example, when receiving the services provided by the service provision server 300 that belongs to the first group, the MFP 100 transmits the set of the identification information and the security information corresponding to the first group to the service provision server 300. If the set of the identification information and the security information received from the MFP 100 is registered in the service provision server 300, the service provision server 300 authenticates the MFP 100. The service provision server 300 provides the MFP 100 with the services on the condition that the authentication is successful. Further, when receiving the services provided by the service provision server 300A that belongs to the second group, the MFP 100 transmits the set of the identification information and the security information corresponding to the second group to the service provision server 300A. If the set of the identification information and the security information received from the MFP 100 is registered in the service provision server 300A, the service provision server 300A authenticates the MFP 100. The service provision server 300A provides the MFP 100 with the services on the condition that the authentication is successful.

Further, the MFPs 100, 100A to 100D share a predetermined region of an HDD included in each of the MFPs 100, 100A to 100D. In this case, each of the MFPs 100, 100A to 100D, on the condition that authentication of a device or a user that accesses the region set to be shared in the HDD 115 (see FIG. 3) is successful, permits an access to the region in order to increase the security. Specifically, the security information for accessing the HDD 115 is registered in advance in each of the MFPs 100, 100A to 100D, and each of the MFPs 100, 100A to 100D permits the device that has transmitted the registered security information to access the region set to be shared in the HDD 115. The security information in this case is the password, and is the same among the MFPs 100, 100A to 100D.

Further, when transmitting and receiving data, each of the MFPs 100, 100A to 100D encrypts the data in order to increase the security, and transmits and receives the data. Each of the MFPs 100, 100A to 100D stores a password used for this encryption as the security information. Specifically, each of the MFPs 100, 100A to 100D encrypts the data by using the security information in transmitting the data, and decrypts the data by using the security information in receiving the data. The security information in this case is the same among the MFPs 100, 100A to 100D.

The management server 200 manages the security information stored in each of the service provision servers 300, 300A and the MFPs 100, 100A to 100D. Specifically, the management server 200 defines a security policy defining the date and time at which the security information is updated for every type of the security information. The security policy defines the reference date and time for every type of the security information. Specifically, a user who operates the management server inputs the reference date and time for every type of the security information in the management server 200. Thus, a policy table that defines the reference date and time for every type of the security information is stored in the management server 200.

Figure 2:
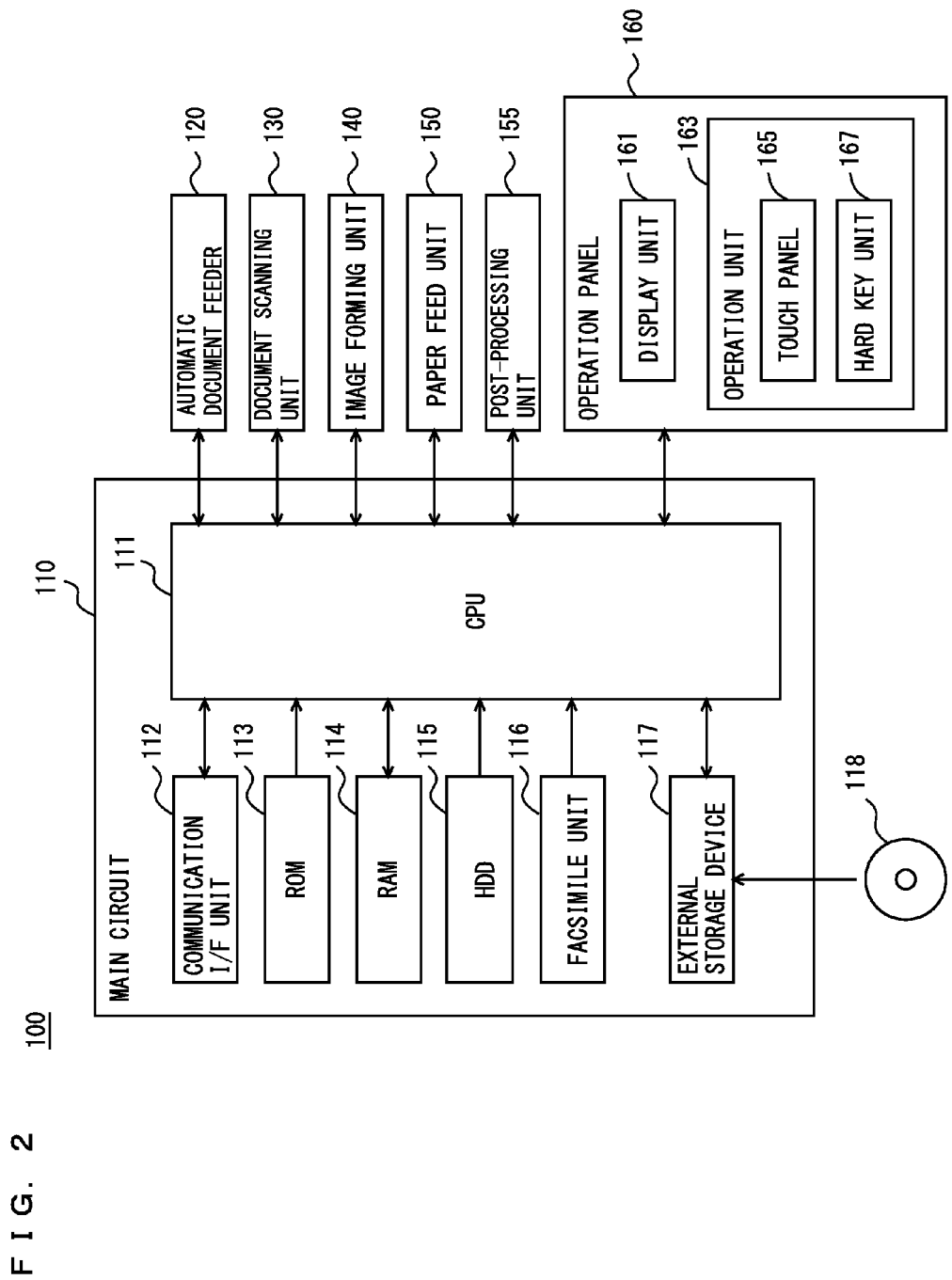
FIG. 2 is a block diagram showing one example of an outline of hardware configurations of an MFP in the present embodiment.

FIG. 2 is a block diagram showing one example of an outline of the hardware configurations of the MFP in the present embodiment. Referring to FIG. 2, the MFP 100 includes a main circuit 110, a document scanning unit 130 for scanning a document, an automatic document feeder 120 for conveying a document to the document scanning unit 130, an image forming unit 140 for forming an image on a sheet of paper or other medium based on image data scanned and output by the document scanning unit 130, a paper feed unit 150 for supplying a sheet of paper to the image forming unit 140, a post-processing unit 155 for processing a sheet of paper on which an image is formed, and an operation panel 160 serving as a user interface.

The post-processing unit 155 performs a sorting process of sorting and discharging one or more sheets of paper on which images have been formed by image forming unit 140, a hole-punching process of punching the sheets, and a stapling process of stapling the sheets.

The main circuit 110 includes a CPU (Central Processing Unit) 111, a communication interface (I/F) unit 112, a ROM (Read Only Memory) 113, a RAM (Random Access Memory) 114, and a hard disk drive (HDD) 115 used as a mass storage device, a facsimile unit 116, and an external storage device 117 on which a CD-ROM (Compact Disk ROM) 118 is mounted. The CPU 111 is connected to the automatic document feeder 120, the document scanning unit 130, the image forming unit 140, the paper feed unit 150, the post-processing unit 155, and the operation panel 160, and controls the entire MFP 100.

The ROM 113 stores a program executed by the CPU 111 or necessary data for executing the program. The RAM 114 is used as a work area when the CPU 111 executes the program. Further, the RAM 114 temporarily stores scan data (image data) successively sent from the document scanning unit 130.

The operation panel 160, which is provided on an upper surface of the MFP 100, includes a display unit 161 and an operation unit 163. The display unit 161 is a display device such as a liquid crystal display device (LCD) or an organic ELD (Electro-Luminescence Display), and displays an instruction menu for the user, information about acquired image data, and others. The operation unit 163 includes a hard key unit 167 having a plurality of keys, and accepts input data such as each type of an instruction, characters, and numerical characters by the key operations of the user. The operation unit 163 further includes a touch panel 165 disposed on the display unit 161.

The facsimile unit 116 is connected to the Public Switched Telephone Networks (PSTN), and transmits or receives facsimile data in accordance with a communication procedure of the facsimile.

The communication I/F unit 120 is an interface for connecting the MFP 100 to the LAN 3. The case where the communication I/F unit 112 transmits and receives data by a communication procedure of a TCP (Transmission Control Protocol) will be described here. While the TCP is described here as one example of the communication procedure, the communication procedure for transmitting and receiving data via the communication I/F unit 112 is not limited to the TCP. For example, the communication procedure may be a UDP (User Datagram Protocol). The CPU 111 communicates with a device connected to the LAN 3 via the communication I/F unit 112, and transmits and receives data. Further, in the case where the LAN 3 is connected to the internet, the communication I/F unit 112 can communicate with the computer connected to the internet.

The HDD 115 has a plurality of storage regions. At least one of the plurality of storage regions is set to be shared, and a password is set. Each of the other MFPs 100A to 100D, the management server 200, the service provision servers 300, 300A can access the storage region set to be shared in the HDD 115 by transmitting the password set for the HDD 155 to the MFP 100.

The external storage device 117 is mounted with the CD-ROM 118. The CPU 111 can access the CD-ROM 118 via the external storage device 117. The CPU 111 loads the program recorded in the CD-ROM 118, which is mounted on the external storage device 117, into the RAM 114 for execution. The medium for storing the program executed by the CPU 111 is not limited to the CD-ROM 118. It may be an optical disc (MO (Magnetic Optical Disc)/MD (Mini Disc)/DVD (Digital Versatile Disc)), an IC card, an optical card, or a semiconductor memory such as a mask ROM, an EPROM (Erasable Programmable ROM), or an EEPROM (Electrically EPROM).

Further, the CPU 111 may load the program stored in the HDD 115 into the RAM 114 for execution. In this case, another computer connected to the network 3 or the internet may rewrite the program stored in the HDD 115 of the MFP 100, or may additionally write a new program therein. Further, the MFP 100 may download a program from another computer connected to the network 3 or the internet, and store the program in the HDD 115. The program referred to here includes not only a program directly executable by the CPU 111 but also a source program, a compressed program, an encrypted program and the like.

Figure 3:
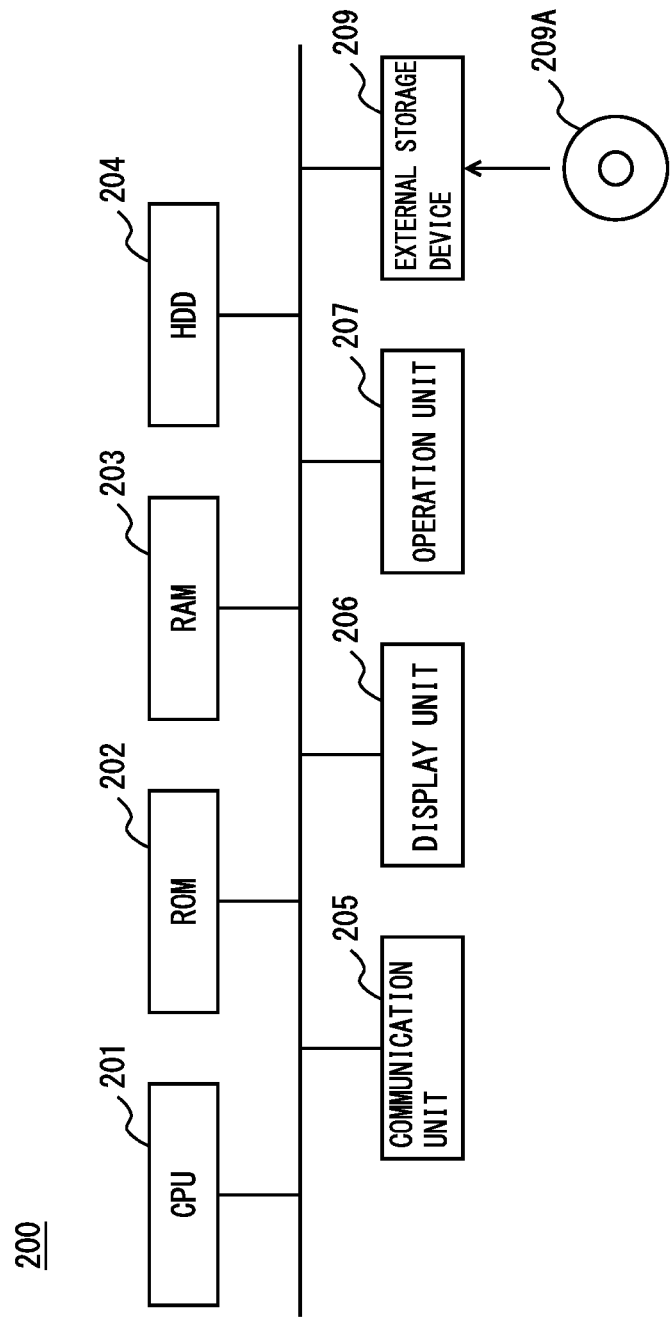
FIG. 3 is a block diagram showing one example of an outline of hardware configurations of a management server in the present embodiment.

FIG. 3 is a block diagram showing one example of an outline of hardware configurations of the management server in the present embodiment. Referring to FIG. 3, the management server 200 includes a CPU 201 for controlling the entire management server 200, a ROM 202 for storing a program to be executed by the CPU 201, a RAM 203 used as a work area of the CPU 201, an HDD 204 that stores data in a nonvolatile manner, a communication unit 205 that connects the CPU 201 to the network 3, a display unit 206 that displays information, an operation unit 207 that accepts an input operation by the user, and an external storage device 209.

The external storage device 209 is mounted with the CD-ROM 209A. The CPU 201 can access the CD-ROM 209A via the external storage device 209. The CPU 201 loads the program recorded in the CD-ROM 209A, which is mounted on the external storage device 209, into the RAM 203 for execution. The medium for storing a program executed by the CPU 201 is not limited to the CD-ROM 209A. It may be an optical disc, an IC card, an optical card, or a semiconductor memory such as a mask ROM, an EPROM, or an EEPROM.

Further, the program executed by the CPU 201 is not limited to the program recorded in the CD-ROM 209A, and the program stored in the HDD 204 may be loaded into the RAM 203 for execution. In this case, another computer connected to the network 3 or the internet may rewrite the program stored in the HDD 204 of the management server 200, or may additionally write a new program therein. Further, the management server 200 may download a program from another computer connected to the network 3 or the internet, and store the program in the HDD 204. The program referred to here includes not only a program directly executable by the CPU 201 but also a source program, a compressed program, an encrypted program and the like.

Figure 4:
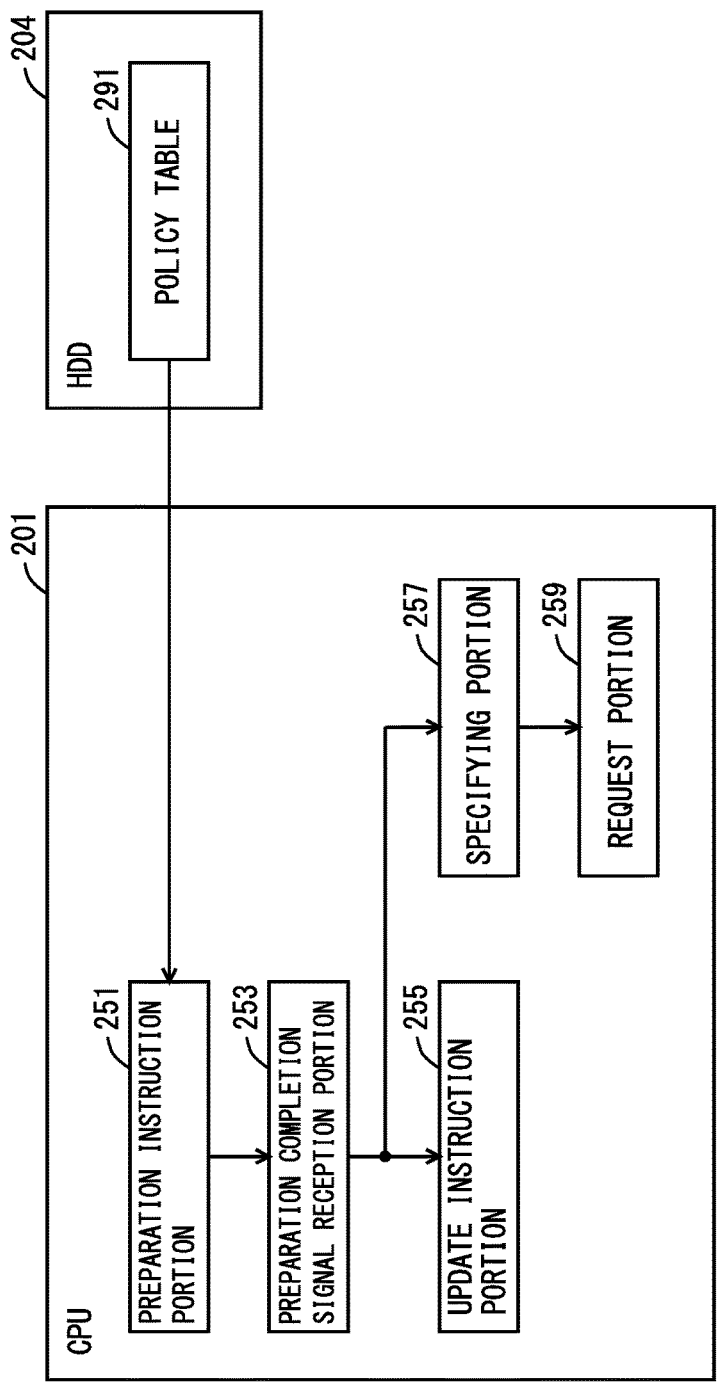
FIG. 4 is a block diagram showing one example of functions of a CPU included in the management server in the present embodiment together with information stored in an HDD.

FIG. 4 is a block diagram showing one example of functions of a CPU included in the management server in the present embodiment together with information stored in the HDD. The functions shown in FIG. 4 are formed in the CPU 201 in the case where the CPU 201 included in the management server 200 executes a management program stored in the ROM 202, the HDD 204 or the CD-ROM 209A. Referring to FIG. 4, the CPU 201 included in the management server 200 includes a preparation instruction portion 251, a preparation completion signal reception portion 253, an update instruction portion 255, a specifying portion 257, and a request portion 259. In the HDD 204, a policy table 291 is stored.

FIG. 5 is a diagram showing one example of the policy table. Referring to FIG. 5, the policy table includes four security records. The security record includes an item of a type, an item of reference date and time, and an item of group devices. The identification information for identifying a type of the security information is set in the item of the type, date and time at which the security information is updated are set in the item of the reference date and time, and the pieces of device identification information of the devices that store the security information are set in the item of the group devices. In the security record in the first line, the identification information "mail-account-A" for identifying the type of the security information is set in the item of the type, "EVERY MONTH, 1, 00:00" is set in the item of the reference date and time, and the respective pieces of device identification information of the service provision server 300 and the MFPs 100, 100A to 100D are set in the item of the group devices. The identification information "mail-account-A" is an account registered in the service provision server 300, which is an electronic mail server. The device identification information of the service provision service 300 is referred to here as a "mail server", and the respective pieces of the device identification information of the MFPs 100, 100A to 100D are referred to here as "MFP-1", "MFP-2", "MFP-3", "MFP-4", and "MFP-5".

In the security record in the second line, identification information "DB-account-B" for identifying the type of the security information is set in the item of the type, "EVERY MONTH, 10, 00:00" is set in the item of the reference date and time, and the respective pieces of device identification information of the service provision server 300A and the MFPs 100, 100A to 100D are set in the item of the group devices. The identification information "DB-account-B" is an account registered in the service provision server 300A, which is a DB server. The device identification information of the service provision server 300A is referred to here as a "DB server".

In the security record in the third line, identification information "HDD ENCRYPTION" is set in the item of the type, "EVERY MONTH, 15, 00:00" is set in the item of the reference date and time, and the respective pieces of device identification information of the MFPs 100, 100A to 100D are set in the item of the group devices. The identification information "HDD ENCRYPTION" is the type of the security information for accessing the HDD. In the security record in the fourth line, identification information "DATA ENCRYPTION" is set in the item of the type, "EVERY MONTH, 20, 00:00" is set in the item of the reference date and time, and the respective pieces of device identification information of the MFPs 100, 100A to 100D are set in the item of the group devices. The identification information "DATA ENCRYPTION" is the type of the security information for encrypting or decrypting data.

Returning to FIG. 4, the preparation instruction portion 251 transmits a preparation instruction to a device that stores the security information to which the reference date and time, which the current date and time have passed, correspond. Specifically, the preparation instruction portion 251 extracts a policy record including the reference date and time, which the current date and time have passed, with reference to the policy table 291. The preparation instruction portion 251 transmits the preparation instruction, which includes the identification information set in the item of the type of the extracted policy record and new security information, to all of the devices specified by the pieces of device identification information set in the item of the group devices. As for the new security information, the security information produced by the preparation instruction portion 251 may be used, or the security information that is input by a user who operates the management server 200 in the operation unit 207 may be used. For example, in the case where extracting the security record in the first line of the policy table 291, the preparation instruction portion 251 transmits the preparation instruction including a set of the identification information "mail-account-A" and the produced password to each of the service provision server 300 and the MFPs 100, 100A to 100D. Upon transmission of the preparation instructions, the preparation instruction portion 251 outputs the identification information and the pieces of device identification information of the plurality of devices to which the preparation instructions have been transmitted to the preparation completion signal reception portion 253.

While an operation of each of the service provision server 300 and the MFPs 100, 100A to 100D that receives the preparation instruction will be described below, each of the service provision server 300 and the MFPs 100, 100A to 100D returns a preparation completion signal including the identification information. Therefore, a device, which does not receive the preparation instruction, among the service provision server 300 and the MFPs 100, 100A to 100D does not return the preparation completion signal.

The preparation completion signal reception portion 253 receives the preparation completion signal transmitted from the device that has received the preparation instruction after the transmission of the preparation instruction by the preparation instruction portion 251. In response to reception of the preparation completion signals respectively including the identification information received from the preparation instruction portion 251 from all of the plurality of devices specified by the plurality of pieces of device identification information received from the preparation instruction portion 251 within a predetermined time period since the reception of the identification information and the plurality of pieces of device identification information from the preparation instruction portion 251, the preparation completion signal reception portion 253 outputs a transmission instruction to the update instruction portion 255. The transmission instruction includes the identification information and the plurality of pieces of device identification information received from the preparation instruction portion 251.

In the case where not receiving the preparation completion signals respectively including the identification information received from the preparation instruction portion 251 from all of the plurality of devices specified by the plurality of pieces of device identification information received from the preparation instruction portion 251 within the predetermined time period since the reception of the identification information and the plurality of pieces of device identification information from the preparation instruction portion 251, the preparation completion signal reception portion 253 outputs a specifying instruction to the specifying portion 257. The specifying instruction includes the identification information, the device identification information of each of one or more devices that has transmitted the preparation completion signal, and the device identification information of each of one or more devices that has not transmitted the preparation completion signal.

In response to reception of the transmission instruction from the preparation completion signal reception portion 253, the update instruction portion 255 transmits an update instruction including the identification information included in the transmission instruction to the plurality of devices respectively specified by the plurality of pieces of device identification information included in the transmission instruction.

In response to reception of the specifying instruction from the preparation completion signal reception portion 253, the specifying portion 257 specifies a request device. The request device is a device that is requested to transmit the preparation instruction to a device that has not received the preparation instruction. The specifying portion 257 specifies one or more devices specified by the device identification information of each of the one or more devices that has transmitted the preparation completion signal included in the specifying instruction as a candidate device, and specifies one or more devices specified by the device identification information of each of the one or more devices that has not transmitted the preparation completion signal included in the specifying instruction as an unprepared device. As for each of the one or more unprepared devices, the specifying portion 257 determines one of the one or more candidate devices as a request device. For each of the service provision servers 300, 300A and the MFPs 100, 100A to 100D, the specifying portion 257 defines a combination with another device in advance. The case where the MFPs 100, 100B to 100D are determined as the candidate devices, the MFP 100A is determined as the unprepared device, and the MFP 100 makes a combination with the MFP 100A is described here as an example.

In the case where the preparation completion signal is not received within a predetermined time period since the transmission of the preparation instructions by the management server 200, it is the case where the MFP 100A is not connected to the network 3 at a time of the transmission of the preparation instructions by the management server 200, the case where the MFP 100 is executing another process and overloaded, or the case where power of the MFP 100A is turned off, for example.

The specifying portion 257 determines the MFP 100, which makes a combination with the MFP 100A, among the MFPs 100, 100B to 100D, which are the candidate devices, as the request device for the MFP 100A, which is the unprepared device. The specifying portion 257 outputs a request instruction including a set of the device identification information of the request device and the device identification information of the unprepared device to the request portion 259.

In response to reception of the request instruction, the request portion 259 requests the request device to transmit the preparation instruction to the unprepared device. The request portion 259 here transmits a request signal for requesting the MFP 100, which is the request device, to transmit the preparation instruction to the MFP 100A, which is the unprepared device. The request signal includes the identification information for identifying the type of the security information, and the device identification information of the MFP 100A, which is the unprepared device. The details of the MFP 100, which is the request device, will be described below. However, in response to reception of the request signal, the MFP 100 transmits the preparation instruction including the identification information included in the request signal. Further, in response to reception of the preparation completion signal from the MFP 100A, the MFP 100 transmits the preparation completion signal to the management server 200 on behalf of the MFP 100A.

In the case where the preparation completion signal reception portion 253 receives the preparation completion signal transmitted by the MFP 100 on behalf of the MFP 100A, a predetermined time period has elapsed since the reception of the plurality of pieces of device identification information by the preparation completion signal reception portion 253 from the preparation instruction portion 251. However, it means that the preparation completion signal reception portion 253 has received the preparation completion signals from all of the plurality of devices specified by the plurality of pieces of device identification information received from the preparation instruction portion 251. In response to reception of the preparation completion signals respectively including the identification information received from the preparation instruction portion 251 from all of the plurality of devices specified by the plurality of pieces of device identification information received from the preparation instruction portion 251 after the predetermined time period has elapsed since the reception of the plurality of pieces of device identification information from the preparation instruction portion 251, the preparation completion signal reception portion 253 outputs the transmission instruction to the update instruction portion 255.

Each of the service provision servers 300, 300A and the MFPs 100, 100A to 100D are one example of the information processing apparatus, and the functions of the CPU included in each of the service provision servers 300, 300A and the functions of the CPU 111 included in each of the MFPs 100, 100A to 100D are basically the same. As for the functions of the CPU included in the information processing apparatus, the functions of the CPU 111 included in the MFP 100 will be described here as an example.

Figure 6:
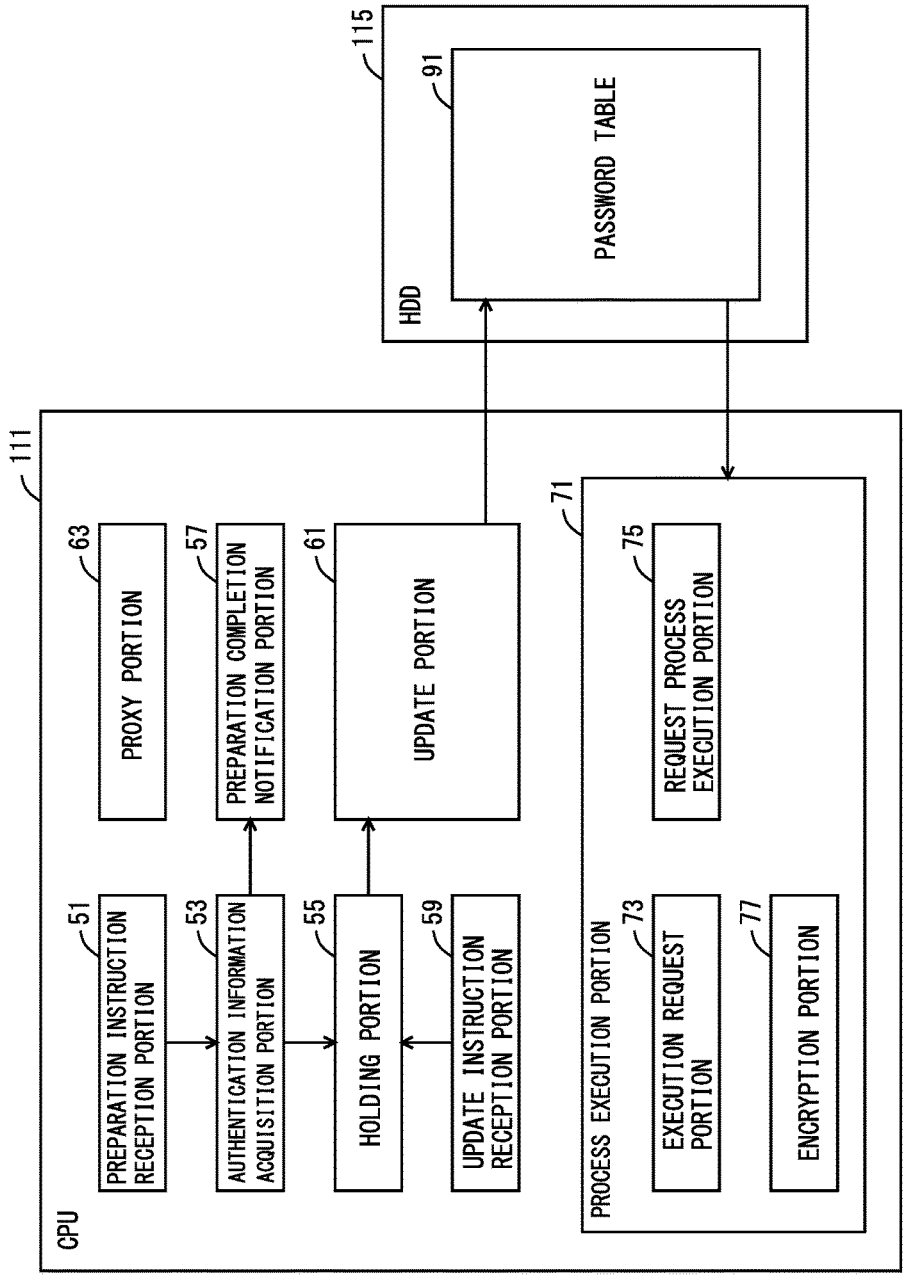
FIG. 6 is a block diagram showing one example of functions of a CPU included in the MFP in the present embodiment together with information stored in an HDD.

FIG. 6 is a block diagram showing one example of the functions of the CPU included in the MFP in the present embodiment together with the information stored in the HDD. The functions shown in FIG. 6 are functions formed in the CPU 111 in the case where the CPU 111 included in the MFP 100 executes the security information update program stored in the ROM 113, the HDD 115, or the CD-ROM 118. Referring to FIG. 6, the CPU 111 included in the MFP 100 includes a preparation instruction reception portion 51, an authentication information acquisition portion 53, a holding portion 55, a preparation completion notification portion 57, an update instruction reception portion 59, an update portion 61, and a process execution portion 71.

A password table 91 is stored in the HDD 115. The password table 91 includes sets of the identification information and the security information. Specifically, a set of the identification information "mail-account-A" and the security information stored in the service provision server 300, a set of the identification information "DB-account-B" and the security information stored in the service provision server 300A, a set of the identification information "HDD ENCRYPTION" and the security information for accessing the shared region of the HDD 115, and a set of the identification information "DATA ENCRYPTION" and the security information for encrypting or decrypting data are included.

The preparation instruction reception portion 51 controls the communication I/F unit 112 and receives the preparation instruction from the management server 200. The preparation instruction includes the identification information for identifying the type of the security information. In response to the reception of the preparation instruction, the preparation instruction reception portion 51 outputs the received preparation instruction to the authentication information acquisition portion 53.

In response to reception of the preparation instruction, the authentication information acquisition portion 53 acquires new security information specified by the identification information included in the preparation instruction. Because the preparation instruction here includes the new security information, the authentication information acquisition portion 53 acquires the security information included in the preparation instruction. In the case where the preparation instruction does not include the security information, the authentication information acquisition portion 53 acquires the new security information from an external source. For example, the authentication information acquisition portion 53 acquires the security information input by a user in the operation unit 163, for example. Further, the authentication information acquisition portion 53 may acquire the new security information from a device corresponding to the security information specified by the identification information. More specifically, in the case where the security information specified by the identification information is used for transmission and reception of electronic mails, the new security information is acquired from the service provision server 300. In the case where acquiring the new security information, the authentication information acquisition portion 53 outputs a set of the identification information and the new security information to the holding portion 55, and outputs a notification instruction to the preparation completion notification portion 57. The notification instruction includes the identification information for identifying the security information.

In response to reception of the notification instruction, the preparation completion notification portion 57 notifies the management server 200 of completion of the preparation. Specifically, the preparation completion notification portion 57 transmits the preparation completion signal to the management server 200 via the communication I/F unit 200. The preparation completion signal includes the identification information included in the notification instruction. In response to reception of the preparation completion signals respectively including the identification information that is the same as the identification information included in the preparation instruction from all of the plurality of devices that have transmitted the preparation completion signals, the management server 200 that receives the preparation completion signals transmits the update instructions to the plurality of respective devices that have transmitted the preparation completion signals. The update instruction includes the identification information that is the same as the identification information included in the preparation completion signal.

The update instruction reception portion 59 controls the communication I/F unit 112 and receives the update instruction from the management server 200. In response to the reception of the update instruction, the update instruction reception portion 59 outputs the received update instruction to the holding portion 55.

In response to reception of a set of the identification information and the new security information from the authentication information acquisition portion 53, the holding portion 55 temporarily stores them in the RAM 114. In response to reception of the update instruction from the update instruction reception portion 59, the holding portion 55 reads out the new security information that makes a set with the identification information included in the update instruction, and outputs a set of the identification information and the new security information to the update portion 61.

In response to reception of the set of the identification information and the new security information from the holding portion 55, the update portion 61 specifies a set including the identification information that is the same as the identification information received from the holding portion 55 from among the sets of the identification information and the security information stored in the password table 91 stored in the HDD 115, and updates the security information of the specified set with the new security information received from the holding portion 55.

The process execution portion 71 executes a process by using the security information included in the password table 91. The process execution portion 71 associates a process to be executed by the use of the security information with the identification information in advance. Specifically, the process execution portion 71 associates a process of transmitting and receiving electronic mails with the identification information "mail-account-A" for identifying the security information stored in the service provision server 300, which is the electronic mail server. The process execution portion 71 associates a process of accessing a database with the identification information "DB-account-B" for identifying the security information stored in the service provision server 300A, which is the DB server. The process execution portion 71 associates a process of accessing the shared region of the HDD 115 with the identification information "HDD ENCRYPTION" for identifying the security information, which is used for accessing the shared region of the HDD 115. The process execution portion 71 associates a process of transmitting and receiving data with the identification information "DATA ENCRYPTION" for identifying the security information, which is used for encryption or decryption of data.

The process execution portion 71 includes an execution request portion 73, a request process execution portion 75, and an encryption portion 77. The execution request portion 73 requests another device to execute a process. The request process execution portion 75 executes a process requested by another device.

In the case where the process of transmitting and receiving electronic mails is to be executed, the execution request portion 73 requests the service provision server 300, which is the electronic mail server, to execute the process. In the case where the process of transmitting and receiving electronic mails is to be executed, the execution request portion 73 specifies the identification information "mail-account-A" that is associated with the process of transmitting and receiving electronic mails, and reads out the security information that makes a set with the specified identification information "mail-account-A" from the password table 91. The execution request portion 73 transmits the specified identification information "mail-account-A" and the security information read from the password table 91 to the service provision server 300. In response to successful authentication performed by the service provision server 300, the execution request portion 73 requests the service provision server 300 to transmit and receive electronic mails.

In the case where the process of transmitting electronic mails is to be executed, one example of an electronic mail, which the execution request portion 73 requests the service provision server 300 to transmit, includes an electronic mail for notifying a predetermined destination address of a problem in the case where an error occurs during execution of a job, and an electronic mail for notifying a predetermined destination address of the number of facsimile transmission or the number of facsimile reception reaching the predetermined number in the case where the number of facsimile transmission or the number of facsimile reception reaches the predetermined number. In the case where the process of receiving electronic mails is to be executed, one example of a process, which the execution request portion 73 requests the service provision server 300 to execute, includes a process of receiving and accumulating transmitted electronic mails addressed to the MFP 100, and a process of transmitting the accumulated electronic mails to the MFP 100 at predetermined time intervals.

Further, in the case where the process of accessing a database is to be executed, the execution request portion 73 requests the service provision server 300A, which is the DB server, to execute the process. In the case where the process of accessing a database is to be executed, the execution request portion 73 specifies the identification information "DB-account-B" that is associated with the process of accessing a database, and reads out the security information that makes a set with the specified identification information "DB-account-B". The execution request portion 73 transmits the specified identification information "DB-account-B" and the security information read from the password table 91 to the service provision server 300A. In response to successful authentication performed by the service provision server 300A, the execution request portion 73 requests the service provision server 300A to execute the process of accessing a database.

One example of the process, which the execution request portion 73 requests the service provision server 300A to execute, includes a process of registering log data showing results of execution of a printing process of forming an image or a scanning process of scanning a document in the database, and a process of registering a log of the printed images in the database.

Further, in the case where a process of accessing a shared region of the HDD 115 of any of the other MFPs 100A to 100D is to be executed, the execution request portion 73 specifies the identification information "HDD ENCRYPTION" that is associated with the process of accessing the shared region of the HDD 115, and reads out the security information that makes a set with the specified identification information "HDD ENCRYPTION" from the password table 91. For example, in the case where a process of accessing a shared region of the HDD 115 of the MFP 100A is to be executed, the execution request portion 73 transmits the specified identification information "HDD ENCRYPTION" and the security information read from the password table 91 to the MFP 100A, and requests the MFP 100A to execute the process of accessing the shared region of the HDD 115 included in the MFP 100A.

In the case where any of the other MFPs 100A to 100D requests the execution of the process of accessing the shared region of the HDD 115, the request process execution portion 75 specifies the identification information "HDD ENCRYPTION" that is associated with the process of accessing the shared region of the HDD 115, and reads out the security information that makes a set with the specified identification information "HDD ENCRYPTION" from the password table 91. For example, in the case where the MFP 100A requests the execution of the process of accessing the shared region of the HDD 115, the request process execution portion 75 executes the process of accessing the shared region of the HDD 115 in response to the request from the MFP 100A on the condition that the security information received from the MFP 100A is the same as the security information read from the password table 91.

In the case where the security information identified by the identification information "HDD ENCRYPTION" is the same among the MFPs 100, 100A to 100D, any of the MFPs 100, 100A to 100D can access the shared region of the HDD 115 of another device among the MFPs 100, 100A to 100D.

In the case where executing a process of transmitting data to an external device, the encryption portion 77 specifies the identification information "DATA ENCRYPTION" that is associated with a process of transmitting to and receiving data from the external device, and reads out the security information that makes a set with the specified identification information "DATA ENCRYPTION" from the password table 91. The encryption portion 77 executes a process of encrypting or decrypting data by using the security information read from the password table 91. For example, in the case where executing a process of transmitting data to the MFP 100A, the encryption portion 77 reads out the security information that makes a set with the identification information "DATA ENCRYPTION" from the password table 91, encrypts the data by using the read security information, and transmits the encrypted data. Further, the encryption portion 77 of the CPU included in the MFP 100A reads out the security information that makes a set with the identification information "DATA ENCRYPTION" from the password table 91, and decrypts the encrypted data received from the MFP 100 by using the read security information. In the case where the security information for encrypting or decrypting the data is the same between the MFP 100 and the MFP 100A, if the encrypted data that is encrypted by the MFP 100 is received by the MFP 100A, the received encrypted data can be decrypted.

While the CPU included in each of the service provision servers 300, 300A has the functions similar to the functions shown in FIG. 6, the function that is specific as the function of the CPU included in each of the service provision servers 300, 300A is the request process execution portion 75. In response to reception of the identification information and the security information from any of the MFPs 100, 100A to 100D, that is, for example, reception of the identification information "mail-account-A" and the security information from the MFP 100, the request process execution portion 75 of the CPU included in the service provision server 300 reads out the security information that makes a set with the identification information that is the same as the identification information "mail-account-A" received from the MFP 100 from the password table 91. On the condition that the security information received from the MFP 100 is the same as the security information read from the password table 91, the request process execution portion 75 executes the process of transmitting and receiving electronic mails in response to the request from the MFP 100.

In response to reception of the identification information and the security information from any of the MFPs 100, 100A to 100D, that is, for example, reception of the identification information "DB-account-B" and the security information from the MFP 100, the request process execution portion 75 of the CPU included in the service provision server 300A reads out the security information that makes a set with the identification information that is the same as the identification information "DB-account-B" received from the MFP 100 from the password table 91. On the condition that the security information received from the MFP 100 is the same as the security information read from the password table 91, the request process execution portion 75 executes the process of accessing a database in response to the request from the MFP 100.

Figure 7:
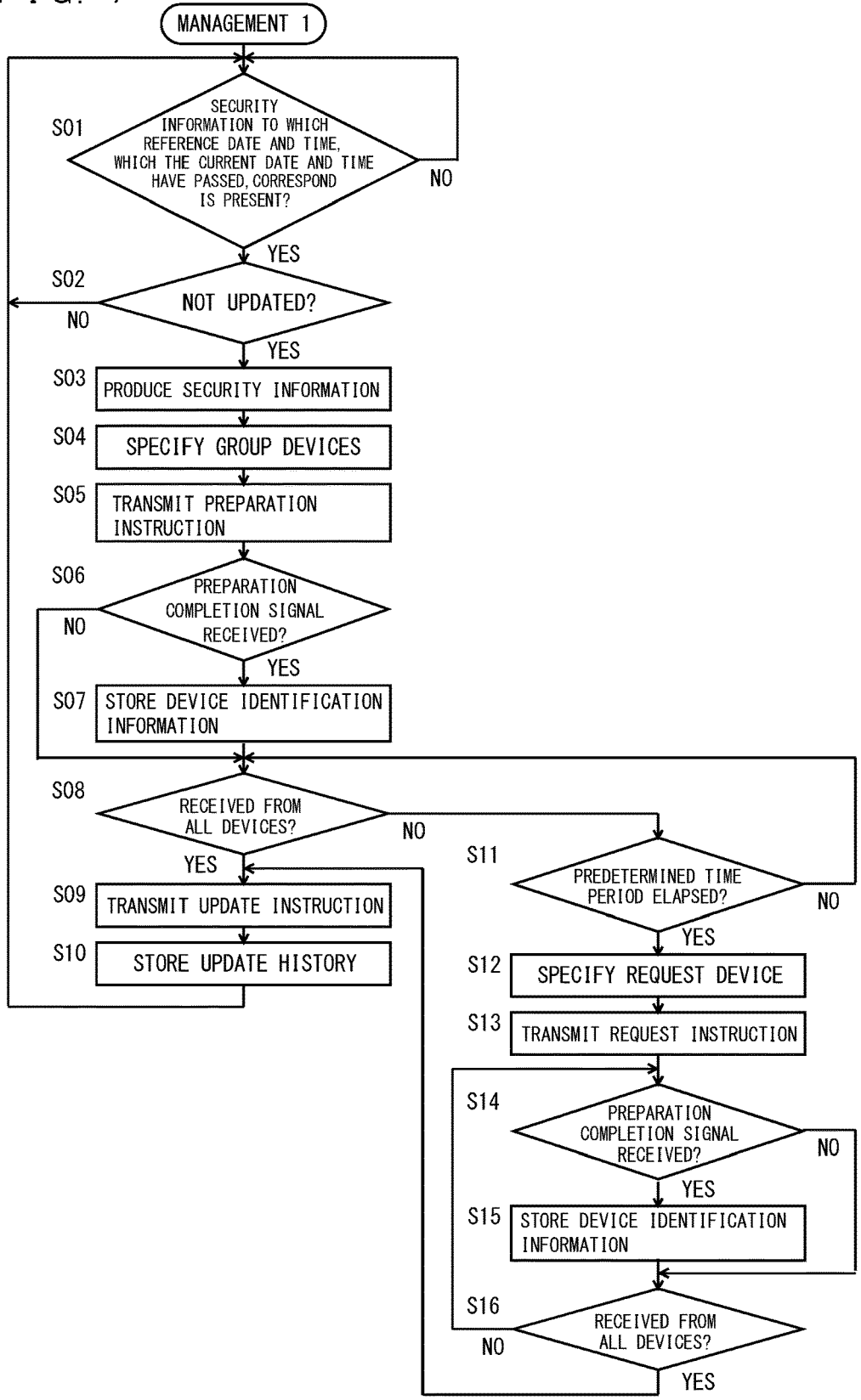
FIG. 7 is a flow chart showing one example of a flow of a management process.

FIG. 7 is a flow chart showing one example of a flow of a management process. The management process is a process executed by the CPU 201 in the case where the CPU 201 included in the management server 200 executes a management program stored in the ROM 202, the HDD 204, or the CD-ROM 209A. Referring to FIG. 7, the CPU 201 included in the management server 200 determines whether the security information to which the reference data and time, which the current date and time have passed, correspond is present (step S01). Specifically, the CPU 201 extracts a policy record including the reference date and time, which the current date and time have passed, with reference to the policy table 291 stored in the HDD 204. In the next step S02, whether the security information is updated is determined. If the security information has not been updated since the current date and time passed the reference date and time, it is determined that the security information is not updated. If the security information has been updated since the current date and time passed the reference date and time, it is determined that the security information is updated. If the security information is updated, the process returns to the step S01. If not, the process proceeds to the step S03. With the date and time at which the security information was updated being specified here as the date and time included in an update history stored in the step S10, described below, whether the security information has been updated since the current date and time passed the reference date and time is determined. Specifically, the CPU 201 extracts the update history including the identification information that is the same as the identification information set in the item of the type of the extracted policy record. If the date and time included in the extracted update history are later than the reference date and time set in the item of the reference date and time of the policy record, the CPU 201 determines that the security information is updated. If the date and time included in the extracted update history are previous to the reference date and time set in the item of the reference date and time of the policy record, the CPU 201 determines that the security information is not updated.

In the step S03, the security information is produced. For example, the CPU 201 produces the security information by using random numbers. In the next step S04, devices that belong to a group are specified. The CPU 201 specifies a plurality of devices respectively specified by a plurality of pieces of device identification information set in the item of the group devices of the policy record extracted in the step S01 as the devices that belong to the group. Then, the preparation instructions are transmitted to the respective devices that belong to the group (step S05). Each preparation instruction includes the identification information set in the item of the type of the policy record extracted in the step S01, and the security information produced in the step S03.

In the step S06, the CPU 201 determines whether the preparation completion signals have been received. If the preparation completion signal has been received from any of the plurality of devices to which the CPU 201 has transmitted the preparation instructions in the step S05, the process proceeds to the step S07. If not, the process proceeds to the step S08. In the step S07, the device identification information of the device that has transmitted the preparation completion signal is temporarily stored, and the process proceeds to the step S08.

In the step S08, it is determined whether the CPU 201 has received the preparation completion signals from all of the plurality of devices to which the CPU 201 have transmitted the preparation instructions. If the plurality of pieces of device identification information temporality stored in the step S07 are the same as the pieces of device identification information of the plurality of devices that belong to the group specified in the step S04, it is determined that the CPU 201 has received the preparation completion signals from all of the devices. If the preparation completion signals are received from all of the devices, the process proceeds to the step S09. If not, the process proceeds to the step S11. In the step S09, the CPU 201 transmits the update instructions to all of the plurality of devices that belong to the group specified in the step S04, and the process proceeds to the step S10. Each update instruction includes the identification information set in the item of the type of the policy record extracted in the step S01. In the step S10, an update flag is set for the identification information set in the item of the type of the policy record extracted in the step S01, and the process returns to the step S01.

In the step S11, whether a predetermined time period has elapsed since the transmission the preparation instructions by the CPU 201 in the step S05 is determined. Because the preparation instructions are transmitted as soon as the current date and time pass the reference date and time, whether the predetermined time period has elapsed since the reference date and time may be determined. If the predetermined time period has elapsed, the process proceeds to the step S12. If not, the process returns to the step S08. In the step S12, the request device is specified. The request device is the device that has transmitted the preparation completion signal, and is associated in advance with the unprepared device that has not transmitted the preparation completion signal. Specifically, a device other than the devices that have transmitted the preparation completion signals among the plurality of devices that belong to the group specified in the step S04 is specified as the unprepared device. The device identification information of the device that has transmitted the preparation completion signal is temporarily stored in the step S07. Then, a device that has transmitted the preparation completion signal and is defined in advance to correspond to the unprepared device among the plurality of devices that belong to the group specified in the step S04 is determined as the request device. In the case where a plurality of unprepared devices are specified, a plurality of request devices respectively corresponding to the plurality of unprepared devices are specified. Because the request device has transmitted the preparation completion signal, the request device has received the preparation instruction.

In the next step S13, the CPU 201 transmits the request instruction to the request device, and the process proceeds to the step S14. Each request instruction includes the identification information set in the item of the type of the policy record extracted in the step S01 and the device identification information of the unprepared device. In the case where a plurality of request devices are specified, the CPU 201 respectively transmits the request instructions to the plurality of request devices.

In the step S14, whether the CPU 201 has received the preparation completion signal is determined. If the CPU 201 has received the preparation completion signal from any of the one or more request devices to which the CPU 201 has transmitted the request instruction in the step S13, the process proceeds to the step S15. If not, the process proceeds to the step S16. In the case where receiving the request instruction, the request device transmits the preparation completion signal on behalf of the unprepared device. Therefore, the CPU 201 receives the preparation completion signal, which the request device transmits on behalf of the unprepared device.

In the step S15, the CPU 201 temporarily stores the device identification information of the unprepared device of which the request device transmits the preparation completion signal on behalf, and the process proceeds to the step S16. In the step S16, whether the CPU 201 has received the preparation completion signals from all of the plurality of devices to which the CPU 201 has transmitted the preparation instructions. If the plurality of pieces of device identification information temporarily stored in the step S07 or the step S15 are the same as the plurality of pieces of device identification information of the plurality of devices that belong to the group specified in the step S04, it is determined that the CPU 201 has received the preparation completion signals from all of the devices. If the CPU 201 has received the preparation completion signals from all of the devices, the process proceeds to the step S09. If not, the process returns to the step S14.

In the step S09, the update instructions are transmitted. The CPU 201 respectively transmits the update instructions to the plurality of devices specified as the devices that belong to the group in the step S04. Each update instruction includes the identification information set in the item of the type of the policy record extracted in the step S01.

In the next step S10, the CPU 201 stores the update history, and the process returns to the step S01. The update history includes the identification information set in the item of the type of the policy record extracted in the step S01, and the date and time at which the update instruction is transmitted.

Figure 8:
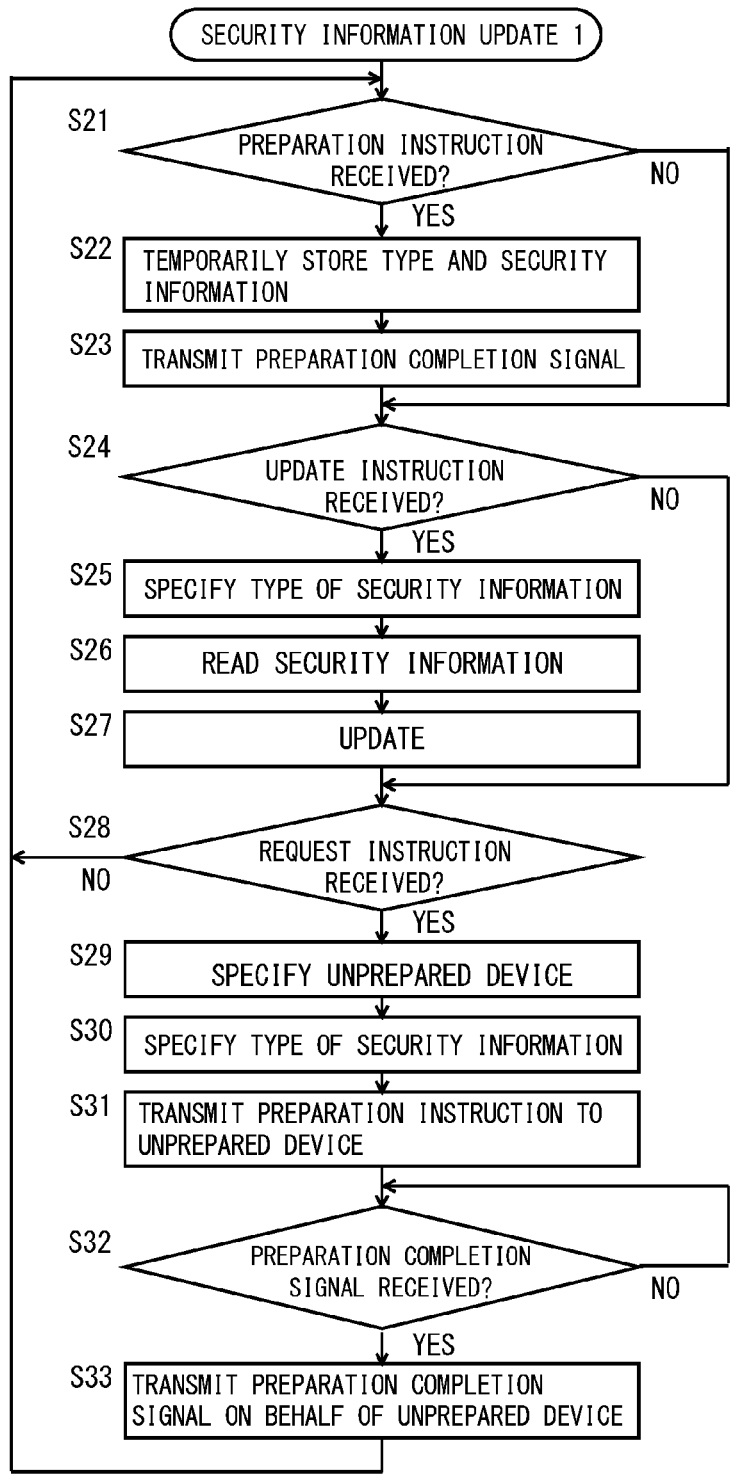
FIG. 8 is a flow chart showing one example of a flow of a security information update process.

FIG. 8 is a flow chart showing one example of a flow of a security information update process. The security information update process is a process executed by the CPU 111 in the case where the CPU 111 included in each of the MFPs 100, 100A to 100A executes a security information update program stored in ROM 113, the HDD 115 or the CD-ROM 118. Further, the security information update process is a process executed by the CPU in the case where the CPU included in each of the service provision servers 300, 300A executes a security information update program stored in the ROM, the HDD or the CD-ROM included in each of the service provision servers 300, 300A. A process executed by the CPU 111 in the case where the CPU 111 included in the MFP 100 executes the security information update program is described here.

Referring to FIG. 8, the CPU 111 included in the MFP 100 determines whether the preparation instruction has been received (step S21). There are the case where the CPU 111 receives the preparation instruction from the management server 200, and also the case where the CPU 111 receives the preparation instruction from the request device, described below. The case where the CPU 111 receives the preparation instruction from the management server 200 is described here as an example, and the case where the CPU 111 receives the preparation instruction from the request device will be described below. If the CPU 111 receives the preparation instruction from the management server 200, the process proceeds to the step S22. If not, the process proceeds to the step S25.

In the step S22, the CPU 111 temporarily stores the identification information and the security information included in the preparation instruction, and the process proceeds to the step S23. In the step S23, the preparation completion signal is transmitted to the management server 200, and the process proceeds to the step S25. The preparation completion signal includes the identification information included in the preparation instruction received in the step S21.

In the step S24, whether the CPU 111 has received the update instruction from the management server 200 is determined. If the update instruction is received, the process proceeds to the step S25. If not, the process proceeds to the step S28. In the step S25, the CPU 111 specifies the type of the security information. The identification information included in the update instruction is specified as the type of the security information. Then, the CPU 111 reads out the security information that makes a set with the specified identification information from among the security information temporarily stored in the step S23 (step S26), and the process proceeds the step S27. In the step S27, the CPU 111 updates the password table 91 stored in the HDD 115 with the read security information, and the process proceeds to the step S28. Specifically, the CPU 111 specifies a set including the identification information that is the same as the identification information specified in the step S25 from among sets of the identification information and the security information included in the password table 91 stored in the HDD 115, and updates the security information of the specified set with the security information read in the step S26.

In the step S28, whether the CPU 111 has received the request instruction from the management server 200 is determined. If the request instruction is received, the process proceeds to the step S29. If not, the process returns to the step S21. In the step S29, the CPU 111 specifies the unprepared device. The device specified by the device identification information included in the request instruction is specified as the unprepared device. In the next step S30, the CPU 111 specifies the type of the security information. The identification information included in the request instruction is specified as the type of the security information. In the next step S31, the CPU 111 transmits the preparation instruction to the unprepared device specified in the step S29. The preparation instruction to be transmitted here is the preparation instruction received in the step S21, and the preparation instruction including the identification information that is the same as the identification information specified in the step S30. In the next step S32, whether the CPU 111 has received the preparation completion signal from the unprepared device to which the CPU 111 has transmitted the preparation instruction in the step S31 is determined. The process waits until the preparation completion signal is received. If the preparation completion signal is received, the process proceeds to the step S33. In the step S33, the CPU 111 transmits the preparation completion signal to the management server 200 by proxy. Specifically, the CPU 111 transmits the preparation completion signal to the management server 200 on behalf of the unprepared device.

In the step S21, in the case where the CPU 111 receives the preparation instruction from the request device, the process proceeds to the step S22. If not, the process proceeds to the step S24. In the step S22, a set of the identification information and the security information included in the preparation instruction received from the request device is temporarily stored, and the process proceeds to the step S23. In the step S23, the CPU 111 transmits the preparation completion signal to the request device that has transmitted the preparation instruction, and the process proceeds to the step S24. The preparation completion signal includes the identification information included in the preparation instruction received in the step S21.

In the security information update system 1 of the present embodiment as described above, the management server 200 stores the policy table 291. In response to reception of the update completion signals respectively including the identification information "mail-account-A" from all of the service provision server 300 and the MFPs 100, 100A to 100D respectively specified by the six pieces of device identification information set in the item of the group devices of the policy record including the reference date and time, which the current date and time have passed, that is, for example, the policy record of the identification information "mail-account-A", the management server 200 transmits the respective update instructions respectively including the identification information "mail-account-A" to the service provision server 300 and the MFPs 100, 100A to 100D. Each of the service provision server 300 and the MFPs 100, 100A to 100D, that is, for example, the MFP 100 stores the password table 91, acquires the new security information corresponding to the identification information "mail-account-A", temporarily holds it, and in response to reception of the update instruction from the management server 200, updates the security information that makes a set with the identification information "mail-account-A" included in the update instruction among the security information included in the password table 91 with the temporarily held new security information. Therefore, even in the case where acquiring the new security information, because each of the service provision servers 300 and the MFPs 100, 100A to 100D defined by the policy table 291 does not update the security information with the new security information until receiving the update instruction from the management server 200, differences among time points at which the security information is updated among the service provision server 300 and the MFPs 100, 100A to 100D defined by the policy table 291 can be as small as possible.

Further, a request device that is any device among a plurality of devices that store the security information of the same type defined by the policy table 291, that is, for example, the MFP 100 among the service provision server 300 and the MFPs 100, 100A to 100D, requests an execution device that is any device among the service provision server 300 and the MFPs 100, 100A to 100D, that is, for example, the service provision server 300 to execute an electronic mail transmission reception process by transmitting the security information of the type corresponding to the electronic mail transmission reception process to the service provision server 300. Further, the service provision server 300, which is the execution device, executes the electronic mail transmission reception process on the condition that the service provision server 300 stores the security information of the type that is the same as the type of the security information received from the MFP 100, which is the request device. Therefore, a difference between a time point at which the security information is updated in the service provision server 300, which is the execution device, and a time point at which the security information is updated in the MFP 100, which is the request device, can be as small as possible.

Further, the MFPs 100, 100A to 100D respectively specified by the five pieces of device identification information set in the item of the group devices of the policy record of the identification information "HDD ENCRYPTION" respectively encrypt or decrypt the data transmitted and received among the MFPs 100, 100A to 100D by using the security information specified by the identification information "DATA ENCRYPTION", which corresponds to the process of transmitting and receiving the data. Therefore, a difference between a time point at which the security information is updated in the device that encrypts and transmits the data, and a time point at which the security information is updated in the device that receives the encrypted data can be as small as possible.

Further, the management server 200 transmits the preparation instructions to all of the service provision server 300 and the MFPs 100, 100A to 100D that are respectively specified by the six pieces of device identification information set in the item of the group devices of the policy record to which the reference date and time, which the current date and time have passed, correspond, that is, for example, the policy record of the identification information "mail-account-A". In response to reception of the preparation instructions from the management server 200, the service provision server 300 and the MFPs 100, 100A to 100D respectively acquire the new security information specified by the identification information "mail-account-A" included in the preparation instruction. Thus, in each of the service provision server 300 and the MFPs 100, 100A to 100D, a period during which the new security information can be acquired can be limited, and the confidentiality can be improved.

Further, because the preparation instruction transmitted by the management server 200 includes the identification information and the new security information, each of the service provision server 300 and the MFPs 100, 100A to 100D can acquire the new security information at the time of reception of the preparation instruction. Therefore, only the management server 200 has to store the new security information, and the security information can be easily updated.

Further, in the case where the management server 200 has not received the preparation completion signals corresponding to the preparation instructions from all of the service provision server 300 and the MFPs 100, 100A to 100D within a predetermined time period since the transmission of the preparation instructions by the management server 200 to the information processing apparatuses that belong to the same group, that are, for example, the service provision server 300 and the MFPs 100, 100A to 100D that store the security information identified by the identification information "mail-account-A", the management server 200 specifies the MFP 100A, for example, as the unprepared device, which has not transmitted the preparation completion signals. The management server 200 specifies the MFP 100, for example, as the request device, which is the information processing apparatus that has transmitted the preparation completion signals and associated in advance with the MFP 100A, which is the unprepared device. Further, the management server 200 requests the MFP 100, which is the request device, to transmit the security information to the MFP 100A, which is the unprepared device. The MFP 100, which is the request device, transmits the new security information to the MFP 100A, which is the unprepared device. In response to reception of the preparation completion signal from the MFP 100A, which is the unprepared device, the MFP 100 transmits the preparation completion signal to the management server 200 on behalf of the MFP 100A, which is the unprepared device. Thus, the new security information can be acquired as early as possible by all of the service provision server 300 and the MFP 100, 100A to 100D that belong to the group defined by the policy record.

Further, in the case where the management server 200 has not received the preparation completion signals corresponding to the preparation instructions from all of the service provision server 300 and the MFPs 100, 100A to 100D within a predetermined time period since the transmission of the preparation instructions by the management server 200 to the information processing apparatuses that belong to the same group, that are, for example, the service provision server 300 and the MFPs 100, 100A to 100D that store the security information identified by the identification information "mail-account-A", the management server 200 transmits a message to a predetermined transmission destination of the unprepared device. Thus, the management server 200 can notify a predetermined user of the unprepared device that the security information is not updated in the unprepared device.

First Modified Example

In the above-mentioned embodiment, the management server 200 transmits the preparation instructions to the service provision servers 300, 300A and the MFPs 100, 100A to 100D, which function as the information processing apparatuses. In the security information update system of the first modified example, the management server 200 does not transmit the preparation instructions to the information processing apparatuses, but the information processing apparatuses acquire the security information from the management server 200.

Figure 9:
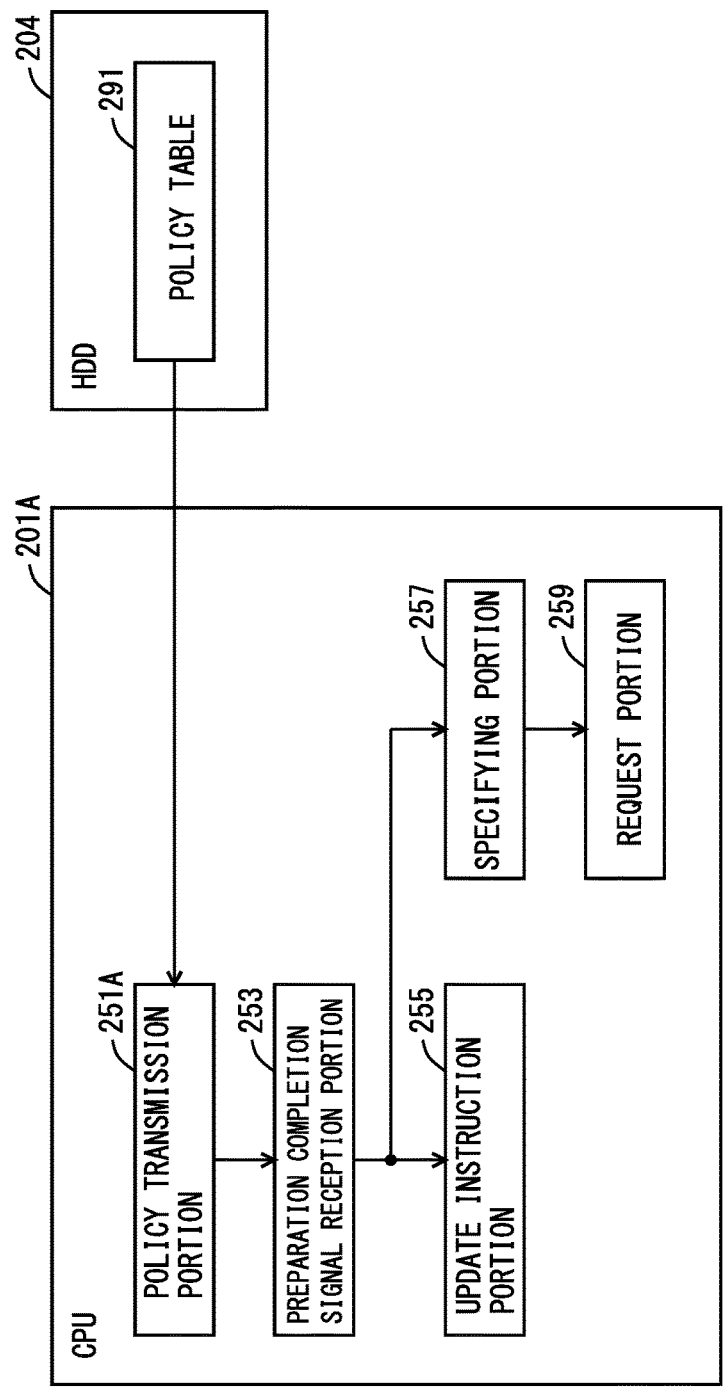
FIG. 9 is a block diagram showing one example of functions of a CPU included in a management server in a first modified example together with information stored in an HDD.

FIG. 9 is a block diagram showing one example of functions of a CPU included in a management server in the first modified example together with the information stored in an HDD. A difference between the functions shown in FIG. 9 and the functions shown in FIG. 4 is that the preparation instruction portion 251 is changed to a policy transmission portion 251A. The other functions are the same as the functions shown in FIG. 4. Thus, a description thereof will not be repeated.

When the security policy is requested by any of the MFPs 100, 100A to 100D and the management provision servers 300, 300A, the policy transmission portion 251A transmits the policy table 291 stored in the HDD 204 to the device that has requested the security policy.

Figure 10:
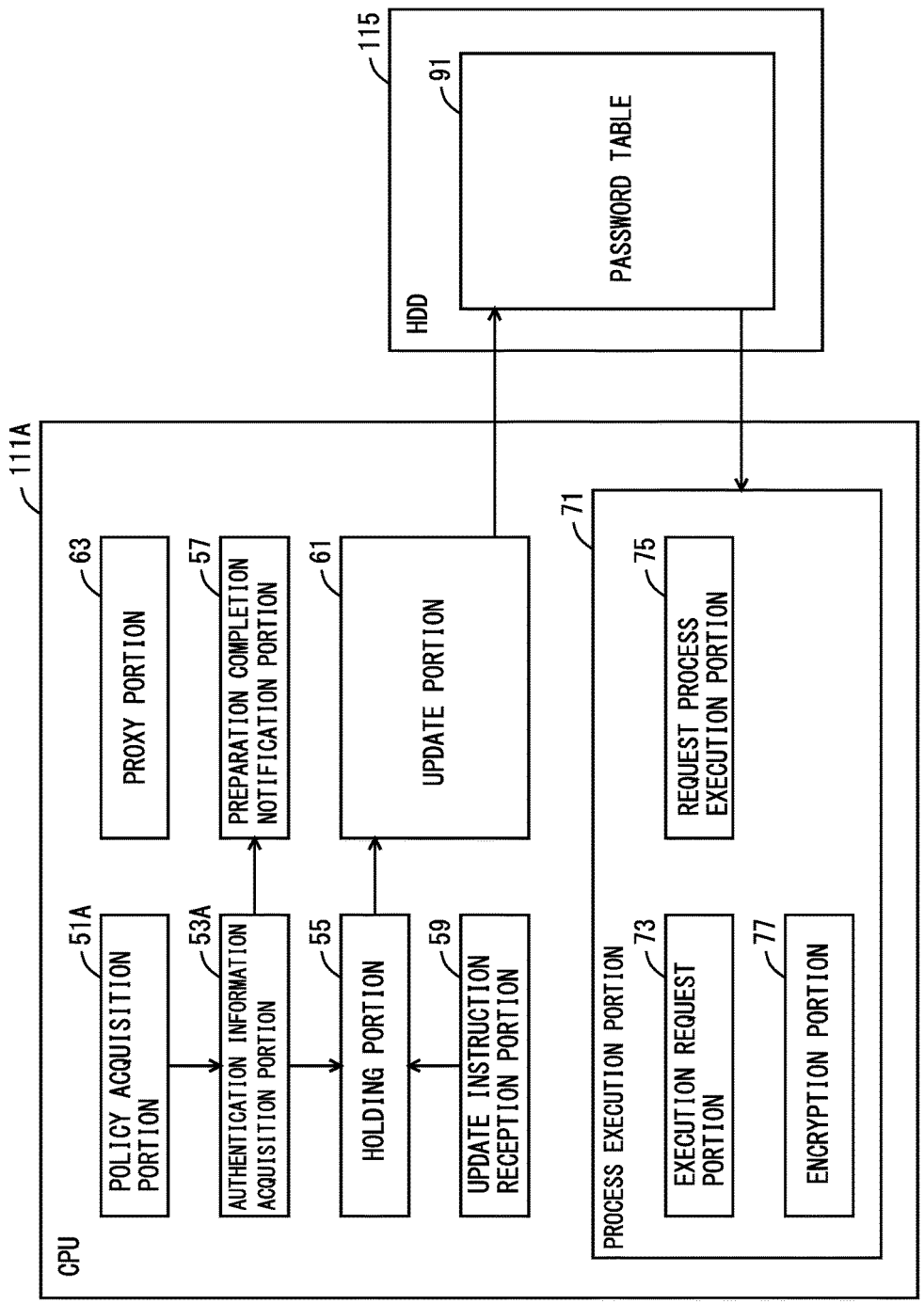
FIG. 10 is a block diagram showing one example of functions of a CPU included in an MFP in the first modified example together with information stored in the HDD.

FIG. 10 is a block diagram showing one example of functions of a CPU included in an MFP of the first modified example. Differences between the functions shown in FIG. 10 and the functions shown in FIG. 6 are that the preparation instruction reception portion 51 and the authentication information acquisition portion 53 are changed to the policy acquisition portion 51A and the authentication information acquisition portion 53A. The other functions are the same as the functions shown in FIG. 6. Thus, a description thereof will not be repeated.

The policy acquisition portion 51A acquires the security policy from the management server 200. A network address of the management server 200 is stored in the HDD 115, and the policy acquisition portion 51A requests the management server 200 to transmit the security policy. The policy acquisition portion 51A acquires the policy table 291, which is transmitted by the management server 200 in response to the request for the security policy. The policy acquisition portion 51A outputs the acquired policy table 291 to the authentication information acquisition portion 53A. The policy acquisition portion 51A may acquire the policy table 291 at a predetermined time. While the predetermined time is not limited, the predetermined time is the time when the power is applied to the MFP 100, or a predetermined time of every day, for example.

The authentication information acquisition portion 53A specifies the type of the security information to which the reference date and time, which the current date and time have passed, correspond with reference to the policy table input from the policy acquisition portion 51A. Specifically, the authentication information acquisition portion 53A extracts a policy record including the reference date and time, which the current date and time have passed, with reference to the policy table input from the policy acquisition portion 51A, and specifies the identification information set in the item of the type of the extracted policy record. The authentication information acquisition portion 53A acquires the new security information of the specified identification information from the management server 200. In the case where acquiring the new security information, the authentication information acquisition portion 53A outputs a set of the identification information and the new security information to the holding portion 55, and outputs the notification instruction to the preparation completion notification portion 57.

Figure 11:
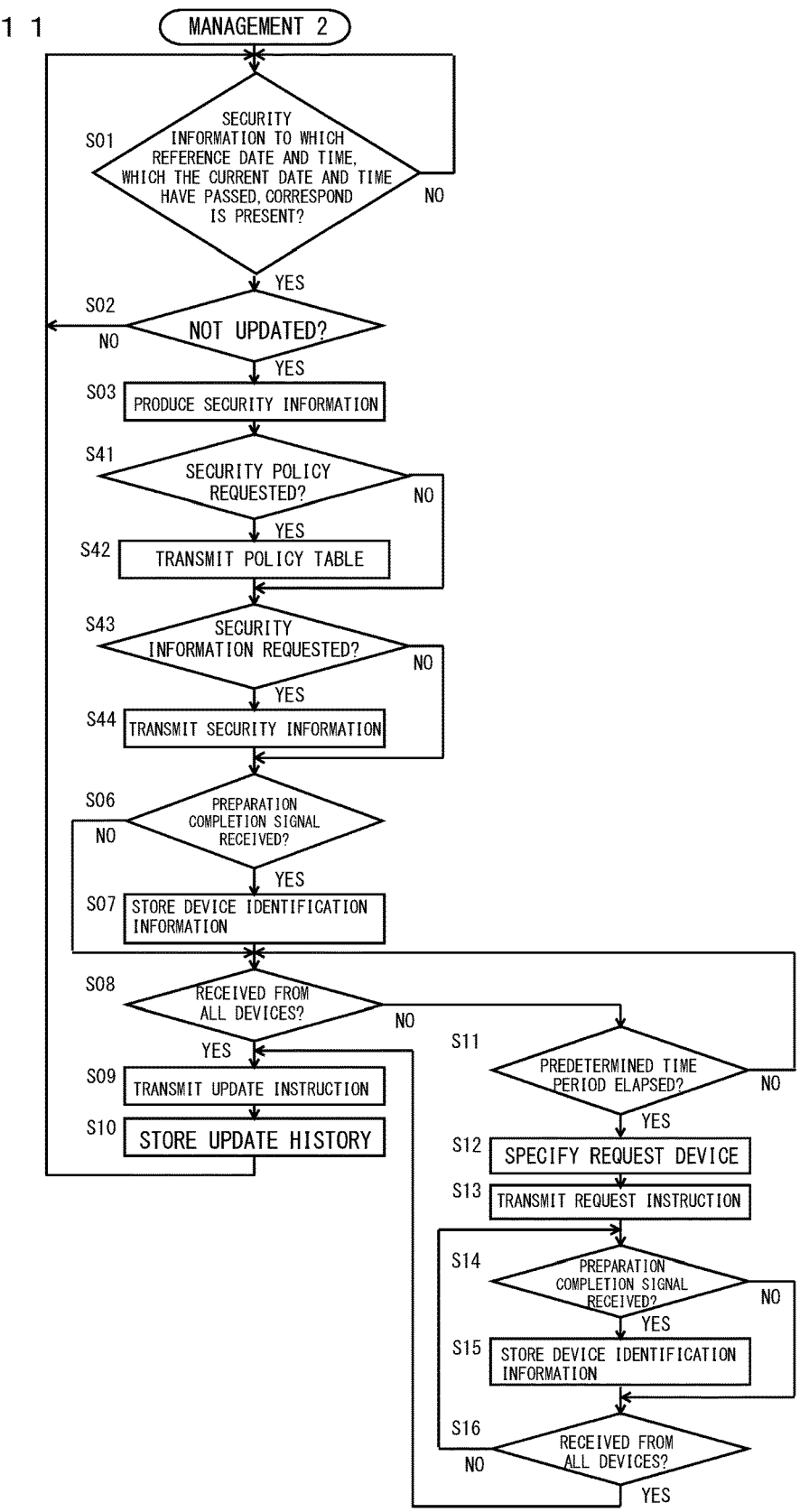
FIG. 11 is a diagram showing one example of a flow of a management process in the first modified example.

FIG. 11 is a diagram showing one example of a flow of a management process in the first modified example. Referring to FIG. 11, differences from the flow chart shown in FIG. 7 are that the step S41 to the step S44 are added instead of the step S04 and the step S05. The other processes are the same as the processes shown in FIG. 7. Thus, a description thereof will not be repeated.

In the step S41, the CPU 201 determines whether there has been a request for the security policy. If the request for the security policy has been received from any of the service provision servers 300, 300A and the MFPs 100, 100A to 100D that functions as the information processing apparatus, the process proceeds to the step S42. If not, the process proceeds to the step S43. In the step S42, the CPU 201 transmits the policy table 291 stored in the HDD 204 to the device, which has requested the security policy, among the service provision servers 300, 300A and the MFPs 100, 100A to 100D, and the process proceeds to the step S43.

In the step S43, the CPU 201 determines whether there has been a request for the security information. If the request for the security information has been received from any of the service provision servers 300, 300A and the MFPs 100, 100A to 100D, which functions as the information processing apparatus, the process proceeds to the step S44. If not, the process proceeds to the step S06. In the step S44, the CPU 201 transmits the security information, which is produced in the step S03 and of the type specified by the request for the security information, to the device, which has requested the security information, among the service provision servers 300, 300A and the MFPs 100, 100A to 100D, and the process proceeds to the step S06.

Figure 12:
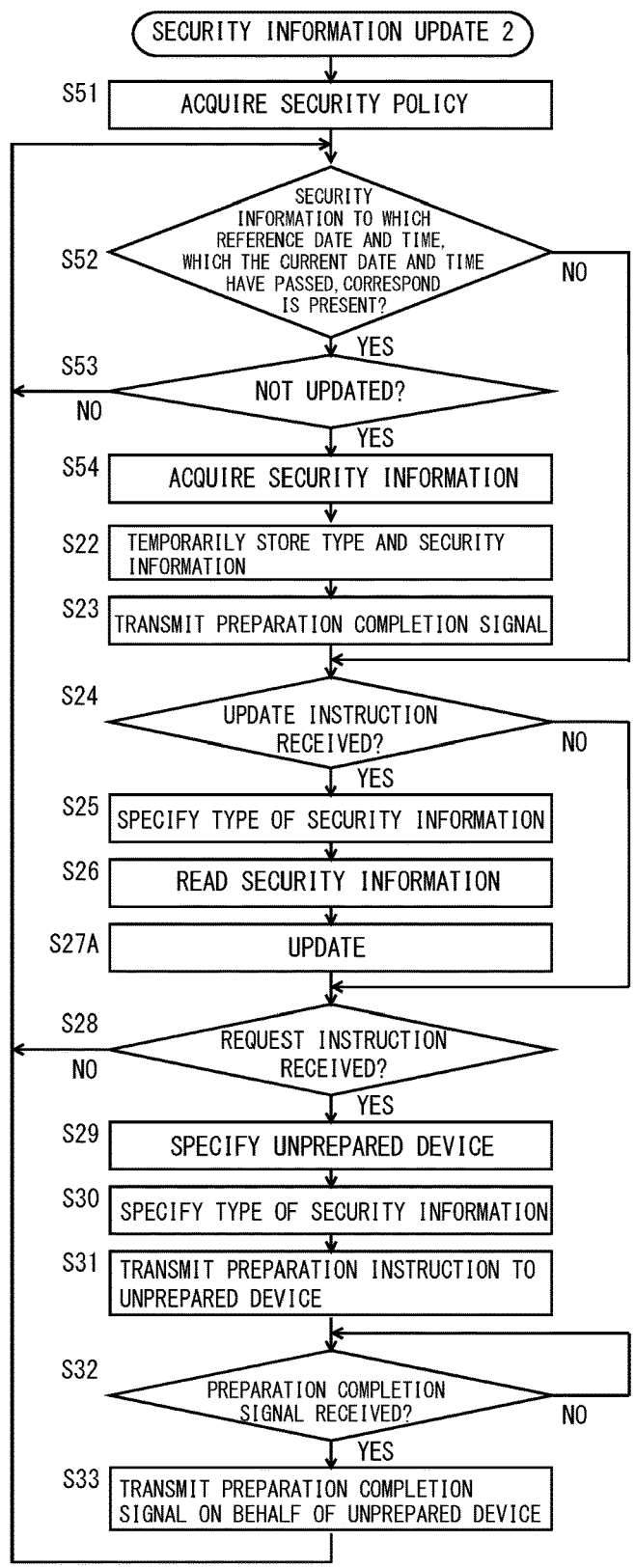
FIG. 12 is a diagram showing one example of a flow of a security information update process in the first modified example.

FIG. 12 is a diagram showing one example of a flow of a security information update process in the first modified example. Referring to FIG. 12, differences from the flow chart shown in FIG. 8 are that the step S51 to S54 are added instead of the step S21, and the step S27 is changed to the step S27A. The other processes are the same as the processes shown in FIG. 8. Thus, a description thereof will not be repeated.

Referring to FIG. 12, the CPU 111 included in the MFP 100 acquires the security policy (step S51). Specifically, the CPU 111 requests the management server 200 to transmit the security policy, and receives the policy table 291, which the management server 200 returns in response to the request. In the next step S52, the CPU 111 determines whether the security information to which the reference date and time, which the current date and time have passed, correspond is present. Specifically, the CPU 111 extracts a policy record including the device identification information of the MFP 100 in the item of the group devices and the reference date and time, which the current date and time have passed, with reference to the policy table 291 received from the management server 200 in the step S51. If such a policy record is extracted, the CPU 111 determines that the current date and time have passed the reference date and time corresponding to the security information specified by the identification information set in the item of the type of the extracted policy record. If the security information to which the reference date and time, which the current date and time have passed, correspond is present, the process proceeds to the step S53. If not, the process proceeds to the step S25.

In the step S53, the CPU 111 determines whether the security information to which the reference date and time, which the current date and time have passed, correspond is updated. If the security information has not been updated since the current date and time passed the reference date and time, it is determined that the security information is not updated. If the security information has been updated since the current date and time passed the reference date and time, it is determined that the security information is updated. If the security information is updated, the process returns to the step S52. If the security information is not updated, the process proceeds to the step S54. Because the security information is updated in the step S27A, whether the security information is updated is determined by comparison of the date and time, which are included in the update history stored concurrently with the update of the security information in the step S27A, with the reference date and time. Specifically, the CPU 111 extracts the update history including the identification information that is the same as the identification information set in the item of the type of the policy record extracted in the step S52. If the date and time included in the extracted update history are later than the reference date and time set in the item of the reference date and time of the policy record, it is determined that the security information is updated. If the date and time included in the extracted update history are previous to the reference date and time set in the item of the reference date and time, it is determined that the security information is not updated.

In the step S54, the security information is acquired, and the process proceeds to the step S22. Specifically, the CPU 111 requests the management server 200 to transmit the security information, and receives the security information returned by the management server 200, which is requested to transmit the security information. The request for the security information includes the identification information set in the item of the type of the policy record extracted in the step S52.

In the step S27A, the password table 91 stored in the HDD 115 is updated with the security information read in the step S26, the update history is stored in the RAM 112, and the process proceeds to the step S28. The update history includes the identification information that is the same as the identification information specified in the step S25.

In the security information update system 1 of the first modified example, the service provision servers 300, 300A and the MFPs 100, 100A to 100D, which are the information processing apparatuses, respectively acquire the policy table 291 from the management server 200. In the case where the policy record including the reference date and time, which the current date and time have passed, is present, that is, for example, the case where the reference date and time of the policy record of the identification information mail-account-A" are later than the current date and time, the service provision servers 300, 300A and the MFPs 100, 100A to 100D respectively acquire the security information specified by the identification information "mail-account-A". Because the service provision servers 300A and the MFPs 100, 100A to 100D that are respectively specified by the six pieces of device identification information set in the item of the group devices of the policy record of the identification information "mail-account-A" respectively acquire the security information specified by the identification information "mail-account-A", differences among time points at which the security information is acquired in the service provision server 300 and the MFPs 100, 100A to 100D that respectively store the security information of the same type can be as small as possible.

Further, because the information processing apparatuses that belong to the same group, that are, for example, the service provision server 300 and the MFPs 100, 100A to 100D, which store the security information identified by the identification information "mail-account-A", acquire the security information from the management server 200, if the new security information is stored in the management server 200, the security information is updated with the new security information in the respective service provision server 300 and MFPs 100, 100A to 100D. Therefore, the security information is easily updated in the service provision server 300 and the MFPs 100, 100A to 100D.

Second Modified Example

In the first modified example, the service provision servers 300, 300A and the MFPs 100, 100A to 100D, which function as the information processing apparatuses, respectively acquire the security information from the management server 200. In the security information update system 1 of the second modified example, each of the service provision servers 300, 300A and the MFPs 100, 100A to 100D acquires the security information from an external source. For example, each of the service provision servers 300, 300A and the MFPs 100, 100A to 100D acquires the security information input by the user who operates them.

In this case, in the management process shown in FIG. 11, the step S43 and the step S44 are unnecessary. Further, in the security information update process shown in FIG. 12, the security information input in the operation unit 163 by the user is acquired in the step S54.

In the security information update system 1 of the second modified example, each of the information processing apparatuses that belongs to the same group, that is, for example, each of the service provision server 300 and the MFPs 100, 100A to 100D, which stores the security information identified by the identification information "mail-account-A", acquires the security information that is input by the user. Thus, the security information is not transmitted and received, and a risk of leaking the security information can be reduced.

Third Modified Example

In the second modified example, each of the service provision servers 300, 300A and the MFPs 100, 100A to 100D, which functions as the information processing apparatus, acquires the security information that is input by the user. The security information update system 1 of the third modified example is different from the security information update system 1 of the second modified example in that, in connection with an occurrence of an event where any of the service provision servers 300, 300A and the MFPs 100, 100A to 100D, which functions as the information processing apparatus, acquires the security information, the other devices that belong to the same group as the device that has acquired the security information acquire the security information.

The policy table 291 stored in the management server 200 defines a plurality of devices that belong to a group for every type of the security information. While the policy table 291 defines a plurality of devices that belong to the same group, the devices that belong to the group are not limited to the devices defined by the policy table 291. For example, each of the service provision servers 300, 300A and the MFPs 100, 100A to 100D, which functions as the information processing apparatus, may store the devices.

For example, in connection with an occurrence of an event where any of the service provision servers 300, 300A and the MFPs 100, 100A to 100D, that is, for example, the service provision server 300 acquires the security information identified by the identification information "mail-account-A", each of the MFPs 100, 100A to 100D that belongs to the same group as the service provision server 300 acquires the security information identified by the identification information "mail-account-A". For example, the service provision server 300 that has acquired the security information transmits the security information and the identification "mail-account-A" indicating the type to each of the other devices MFPs 100, 100A to 100D that belongs to the same group, and each of the MFPs 100, 100A to 100D acquires the security information and the identification information "mail-account-A" received from the service provision server 300. Further, the service provision server 300 that has acquired the security information identified by the identification information "mail-account-A" may transmit the security information and the identification information "mail-account-A" to the management server 200. Then, the management server 200 may transmit the security information and the identification information "mail-account-A" received from the service provision server 300 to each of the other MFPs 100, 100A to 100D that belongs to the same group as the service provision server 300.

In the security information update system 1 of the third modified example, each of the service provision servers 300, 300A and the MFPs 100, 100A to 100D is classified into groups specified by the type of the security information. For example, the service provision server 300 and the MFPs 100, 100A to 100D, which store the security information identified by the identification information "mail-account-A", are classified into the same group. Then, in connection with an occurrence of an event where any one of the service provision server 300 and the MFPs 100, 100A to 100D, which belong to the group corresponding to the identification information "mail-account-A", that is, for example, the service provision server 300 acquires the security information identified by the identification information "mail-account-A", the MFPs 100, 100A to 100A that belong to the same group as the service provision server 300 acquire the security information. Thus, the security information only has to be input in any one of the service provision server 300 and the MFPs 100, 100A to 100D that belongs to the same group, and a user can easily update the security information.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A security information update system that includes a management server and a plurality of information processing apparatuses,
the management server comprising:
a policy storage that stores a security policy defining at least one set of two or more pieces of device identification information respectively corresponding to two or more of the plurality of information processing apparatuses, identification information for identifying security information corresponding to the two or more of the plurality of information processing apparatuses, and a corresponding reference date and time for updating the identified security information corresponding to the two or more of the plurality of information processing apparatuses; and
a first hardware processor configured to output an update instruction to all of the two or more of the plurality of information processing apparatuses in response to reception of respective preparation completion notifications from all of the two or more of the information processing apparatuses, wherein the update instructions are sent after the corresponding date and time have passed and request all of the two or more of the information processing apparatuses to update a stored piece of security information corresponding to the identification information with new security information, such that all of the two or more of the information processing apparatuses are updated with the same new security information, and
each of the plurality of information processing apparatuses comprising:
a security information storage that stores two or more pieces of security information; and
a second hardware processor, wherein the second hardware processor is configured to:
execute a process using any of the stored pieces of security information,
acquire and store the new security information,
in response to the acquisition of the new security information, transmit a preparation completion notification corresponding to identification information of the new security information to the management server, and
in response to reception of the update instruction from the management server, update the security information specified by the identification information corresponding to the update instruction among the stored pieces of security information with the new security information.

2. The security information update system according to claim 1, wherein
the second hardware processor
requests an execution device, which is any of the plurality of information processing apparatuses, to execute a process by transmitting security information corresponding to the process, which the second hardware processor requests the execution device to execute, among the stored security information to the execution device, and
on the condition that the security information received from a request device, which is any of the plurality of information processing apparatuses, is the same as security information of a type that is same as a type of the received security information among the stored security information, executes a predetermined process.

3. The security information update system according to claim 2, wherein
the plurality of information processing apparatuses include a service provision server,
the second hardware processor included in each of one or more client devices, which is other than the service provision server, among the plurality of information processing apparatuses requests the service provision server to execute a process, and
the second hardware processor included in the service provision server, on the condition that security information received from any of the one or more client devices is same as security information of a type that is same as a type of the received security information among the stored security information, executes a process of providing a service to the client device that has transmitted the received security information.

4. The security information update system according to claim 1, wherein
the second hardware processor encrypts or decrypts data transmitted and received between an information processing apparatus and another one of the plurality of information processing apparatuses by using corresponding security information among the stored security information.

5. The security information update system according to claim 1, wherein
the first hardware processor included in the management server
further transmits preparation instructions corresponding to the identification information included in the set including the reference date and time, among the one or more sets defined by the security policy, to all of the two or more information processing apparatuses respectively specified by the two or more pieces of device identification information included in the set including the reference date and time, which the current date and time have passed, and
the second hardware processor,
in response to reception of the preparation instruction from the management server, acquires new security information identified by the identification information corresponding to the preparation instruction.

6. The security information update system according to claim 5, wherein
the preparation instruction transmitted by the first hardware processor included in the management server includes the new security information identified by the identification information included in the set including the reference date and time, and
the second hardware processor acquires the new security information included in the preparation instruction.

7. The security information update system according to claim 5, wherein
the first hardware processor included in the management server,
in case of not receiving preparation completion notifications corresponding to the preparation instructions from all of the two or more information processing apparatuses respectively specified by the two or more pieces of device identification information included in the set including the reference date and time, within a predetermined time period since the transmission of the preparation instructions corresponding to the identification information included in the set including the reference date and time, among the one or more sets defined by the security policy, specifies an unprepared device, which has not transmitted the preparation completion notification, and a request device, which is an information processing apparatus that has transmitted the preparation completion notification and is associated in advance with the unprepared device, among the two or more information processing apparatuses, and
requests the request device to transmit the security information to the unprepared device, and
the second hardware processor included in the request device among the plurality of information processing apparatuses,
in response to the request from the management server, transmits the new security information to the unprepared device, and
in response to reception of a preparation completion notification from the unprepared device, transmits the preparation completion notification to the management server on behalf of the unprepared device, and
the second hardware processor included in the unprepared device among the plurality of information processing apparatuses
acquires the new security information received from the request device, and in response to the acquisition of the new security information from the request device, transmits a preparation completion notification to the request device.

8. The security information update system according to claim 1, wherein
the second hardware processor included in each of the plurality of information processing apparatuses
further acquires the security policy stored in the management server from the management server, and
acquires new security information identified by the identification information included in the set including the reference date and time, which the current date and time have passed, among the one or more sets defined by the acquired security policy.

9. The security information update system according to claim 8, wherein
the management server stores the new security information identified by the identification information included in the set including the reference date and time, among the one or more sets defined by the acquired security policy, and
the second hardware processor included in each of the plurality of information processing apparatuses acquires the new security information from the management server.

10. The security information update system according to claim 9, wherein
the second hardware processor included in an unprepared device among the plurality of information processing apparatuses
in the case where the new security information corresponding to the security information identified by the identification information included in the set including the reference date and time, among the one or more sets defined by the acquired security policy is not acquired within a predetermined time period since the reference date and time, acquires the new security information from a request device that is defined in advance for the unprepared device among the plurality of information processing apparatuses,
in response to the acquisition of the new security information from the request device, transmits a preparation completion notification to the request device, and
the second hardware processor included in the request device among the plurality of information processing apparatuses
transmits the new security information to the unprepared device, and
in response to the reception of the preparation completion notification from the unprepared device, transmits the preparation completion notification to the management server on behalf of the unprepared device.

11. The security information update system according to claim 1, wherein
each of the plurality of information processing apparatuses further includes an operation acceptor that accepts an operation by a user, and
the second hardware processor acquires new security information accepted by the operation acceptor.

12. The security information update system according to claim 1, wherein
the first processor included in the management server, in the case where not receiving the preparation completion notifications corresponding to the identification information included in the set including the reference date and time, among the one or more sets defined by the security policy from all of the two or more information processing apparatuses respectively specified by the two or more pieces of device identification information included in the set including the reference dates and times, further transmits a message to a transmission destination that is defined in advance for an unprepared device, which has not transmitted the preparation completion notification, among the two or more information apparatuses.

13. The security information update system according to claim 1, wherein
the plurality of information processing apparatuses are respectively classified into one or more groups among one or more groups, and
the identification information is group identification information for identifying any of the one or more groups.

14. A security information update method performed by a management server and a plurality of information processing apparatuses, the management server comprising a policy storage that stores a security policy defining at least one set of two or more pieces of device identification information respectively corresponding to two or more of the plurality of information processing apparatuses, identification information for identifying security information corresponding to the two or more of the plurality of information processing apparatuses, and a corresponding reference date and time for updating the identified security information corresponding to the two or more of the plurality of information processing apparatuses, each of the plurality of information processing apparatuses including a security information storage that stores two or more pieces of security information, including:
an update instruction output step of outputting an update instruction from the management server to all of the two or more of the plurality of information processing apparatuses in response to reception of respective preparation completion notifications from all of the two or more of the information processing apparatuses, wherein the update instructions are sent after the corresponding date and time have passed and request all of the two or more of the information processing apparatuses to update a stored piece of security information corresponding to the identification information with new security information, such that all of the two or more of the information processing apparatuses are updated with the same new security information;
a process execution step of executing a process by one of the plurality of information processing apparatuses using any of the stored pieces of security information;
an authentication information acquisition step of acquiring and storing new security information by the one of the plurality of information processing apparatuses;
a preparation completion notification step of, in response to the acquisition of the new security information in the authentication information acquisition step, transmitting a preparation completion notification corresponding to identification information of the new security information from the one of the plurality of information processing apparatuses to the management server; and
an update step of, in response to reception of the update instruction by the one of the plurality of information processing apparatuses from the management server, updating the security information specified by the identification information corresponding to the update instruction among the two or more pieces of stored security information with the new security information.

* * * * *